US010557964B2

(12) United States Patent
Rossetti et al.

(10) Patent No.: US 10,557,964 B2
(45) Date of Patent: Feb. 11, 2020

(54) OPTICAL MODULE AND METHOD TO REALIZE AN OPTICAL MODULE

(71) Applicant: Datalogic IP Tech S.r.l., Lippo di Calderara di Reno (IT)

(72) Inventors: Luca Rossetti, Bologna (IT); Alberto Filippini, San Giovanni in Persiceto (IT); Paolo Aprile, Zola Predosa (IT)

(73) Assignee: DATALOGIC IP TECH S.r.l., Lippo di Calderara di (IT)

( * ) Notice: Subject to any disclaimer, the term of this patent is extended or adjusted under 35 U.S.C. 154(b) by 297 days.

(21) Appl. No.: 15/312,900

(22) PCT Filed: May 19, 2015

(86) PCT No.: PCT/IB2015/053676
§ 371 (c)(1),
(2) Date: Nov. 21, 2016

(87) PCT Pub. No.: WO2015/177721
PCT Pub. Date: Nov. 26, 2015

(65) Prior Publication Data
US 2017/0115429 A1     Apr. 27, 2017

(30) Foreign Application Priority Data

May 21, 2014   (IT) .............................. MI2014A0924
Dec. 16, 2014   (IT) .............................. MI2014A2147

(51) Int. Cl.
*G01V 8/12*      (2006.01)
(52) U.S. Cl.
CPC ..................................... *G01V 8/12* (2013.01)

(58) Field of Classification Search
CPC ...... G01D 11/24; G01D 11/245; G01D 11/26; G01V 8/10; G01V 8/12; G01V 8/20
(Continued)

(56) References Cited

U.S. PATENT DOCUMENTS 8,841,597 B2 * 9/2014 Costello ............... G01D 11/245
250/221
2008/0193088 A1  8/2008 Pfnuer
(Continued)

FOREIGN PATENT DOCUMENTS

DE   102008063691 A1   6/2010
DE   202009015786 U1   4/2011
(Continued)

OTHER PUBLICATIONS

International Search Report with Written Opinion dated Dec. 2, 2015 in International Application No. PCT/IB2015/053676, 18 pages.

*Primary Examiner* — Kevin K Pyo
(74) *Attorney, Agent, or Firm* — Shook, Hardy & Bacon, L.L.P.

(57) ABSTRACT

The present invention relates to a method for manufacturing an optical module for an optical unit, said method comprising: Arranging a tubular body including a casing manufactured in stainless steel, said casing defining an internal surface, a longitudinal axis (X), and a thickness (T), the cross-section of which is perpendicular to said longitudinal axis; Reducing a first thickness of a first section of said casing in a uniform manner for a segment of length (L) along a longitudinal axis (X) of said casing up to a first predetermined thickness ($T_1$) by means of wire-cut electrical discharge machining; Inserting a support holding an electromagnetic radiation emitter and/or a receiver in said casing.

18 Claims, 13 Drawing Sheets

(58) Field of Classification Search
USPC .................................................. 250/239, 221
See application file for complete search history.

(56) References Cited

U.S. PATENT DOCUMENTS

2013/0305821 A1 11/2013 Döbele et al.
2014/0109700 A1 4/2014 Yltchev-Edelmann et al.

FOREIGN PATENT DOCUMENTS

| DE | 202011050083 U1 | 8/2012 |
| FR | 2855296 A1 | 11/2004 |
| JP | 20070743417 A | 3/2007 |
| WO | 2015177721 A9 | 11/2015 |

* cited by examiner

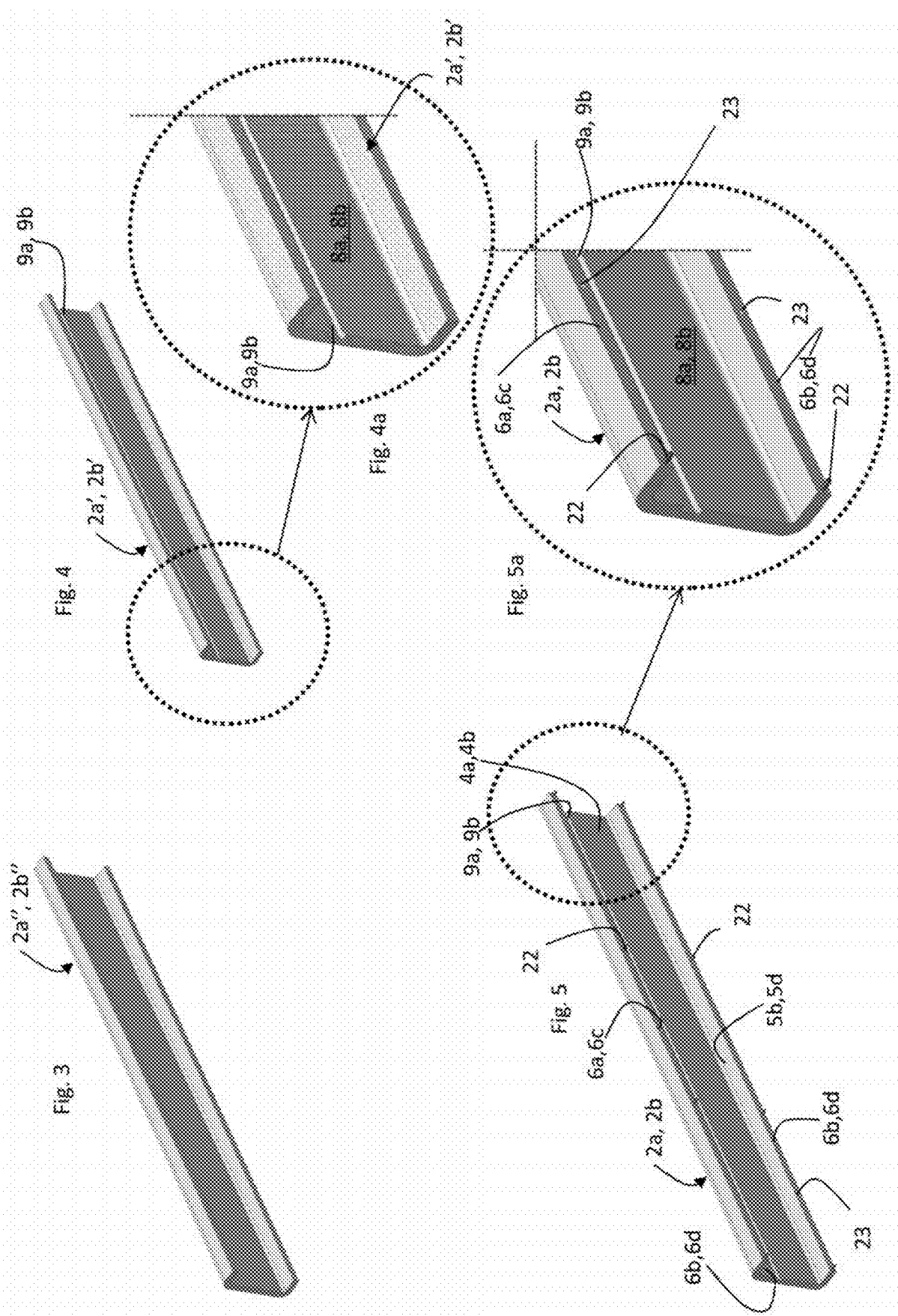

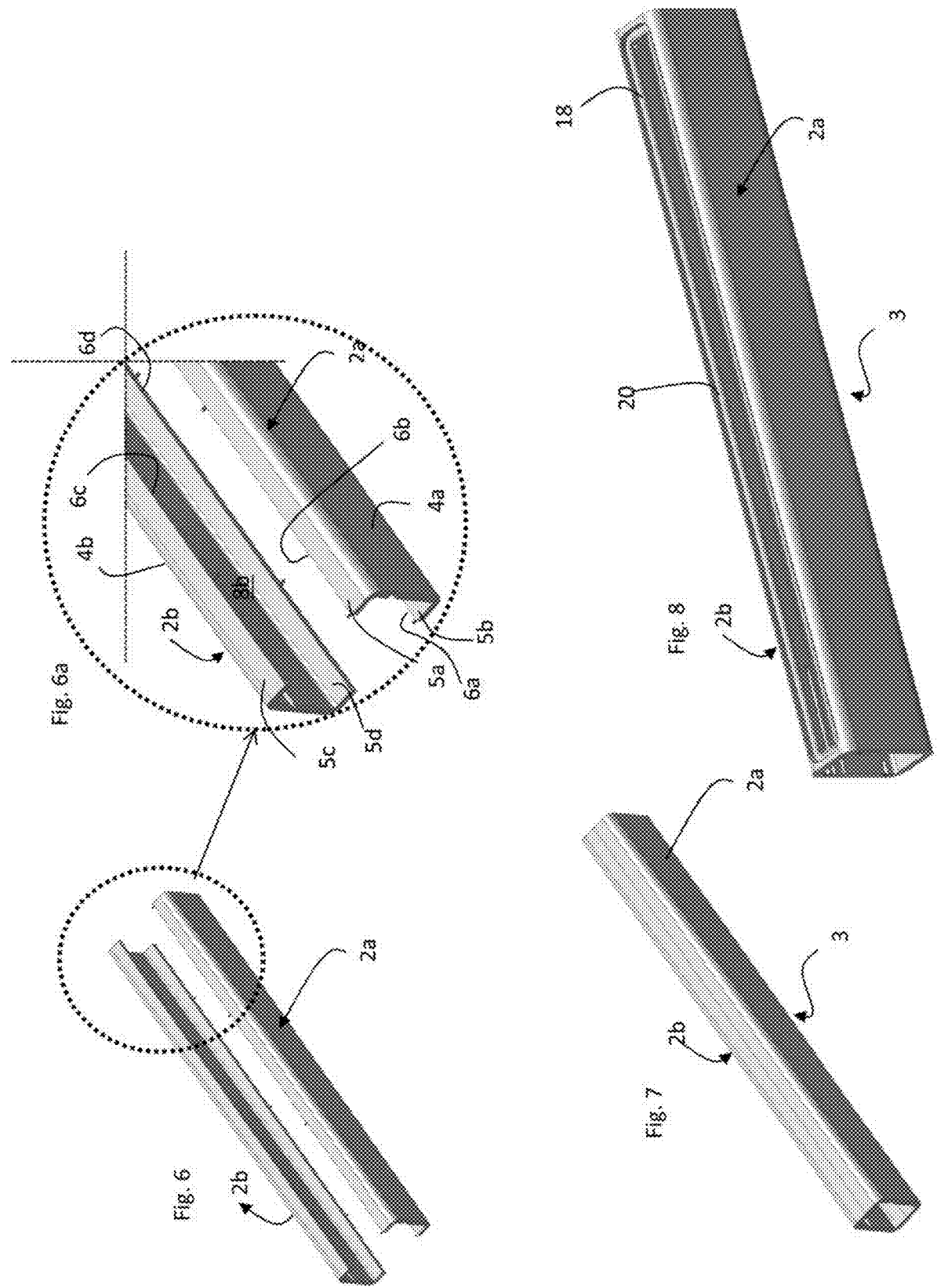

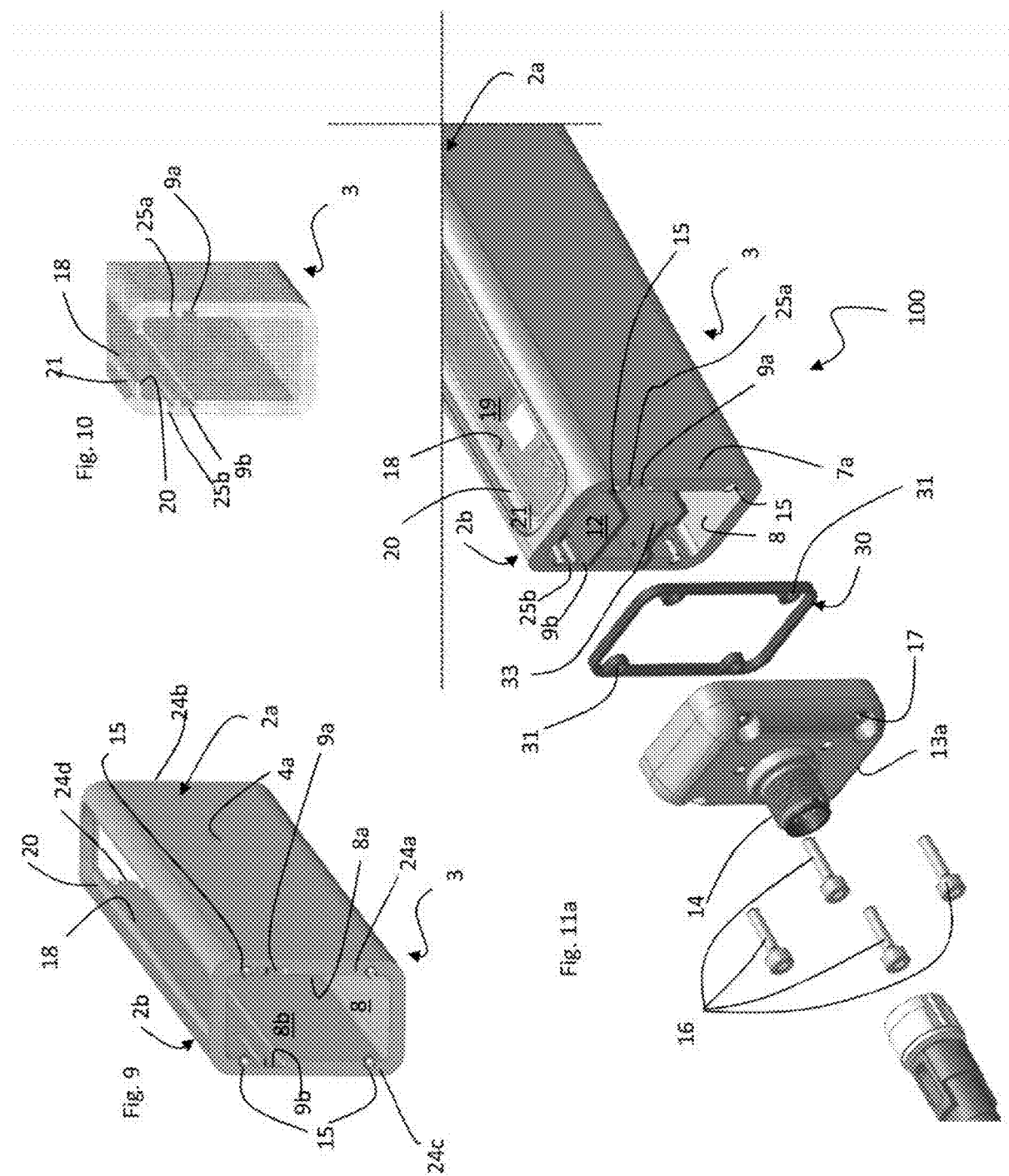

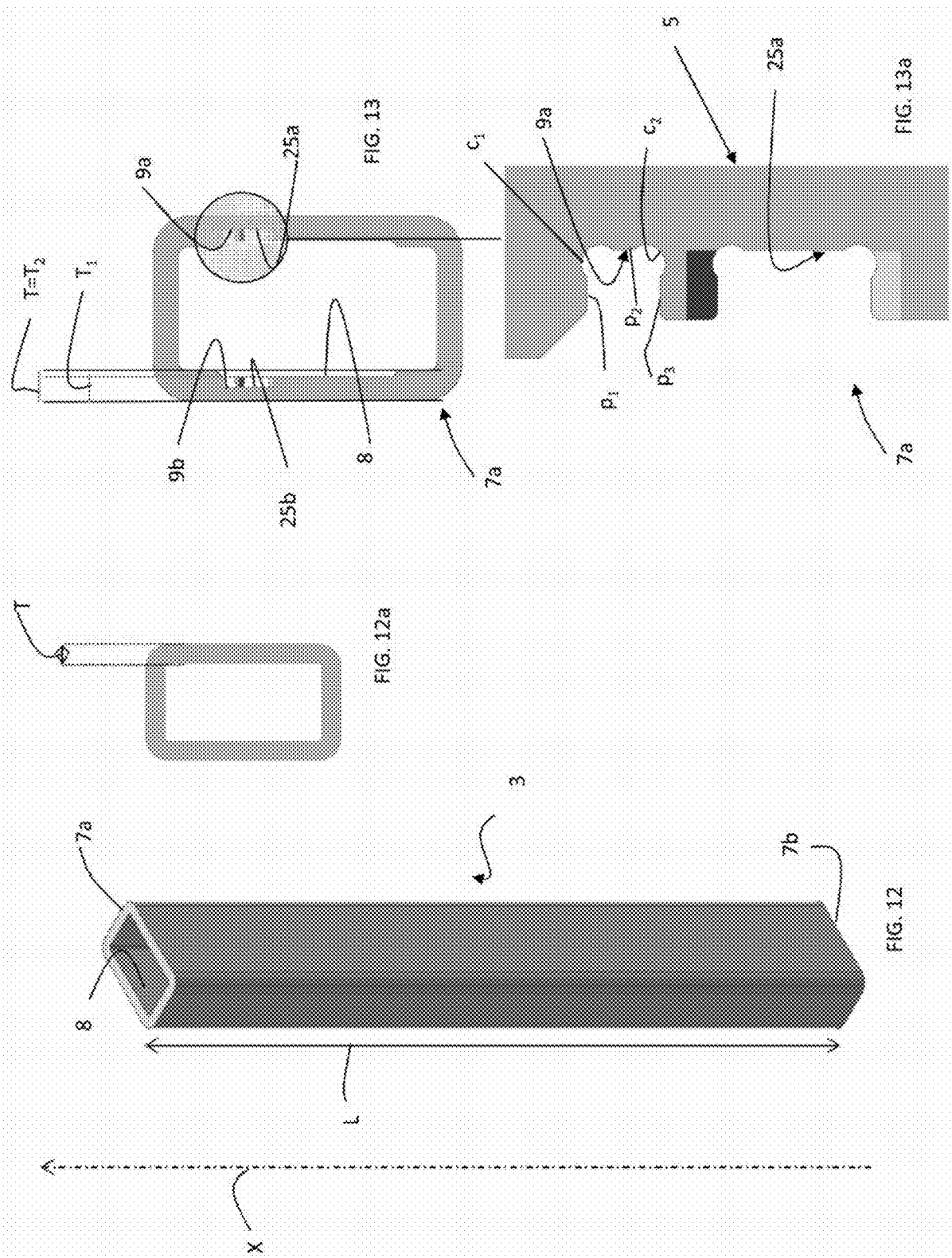

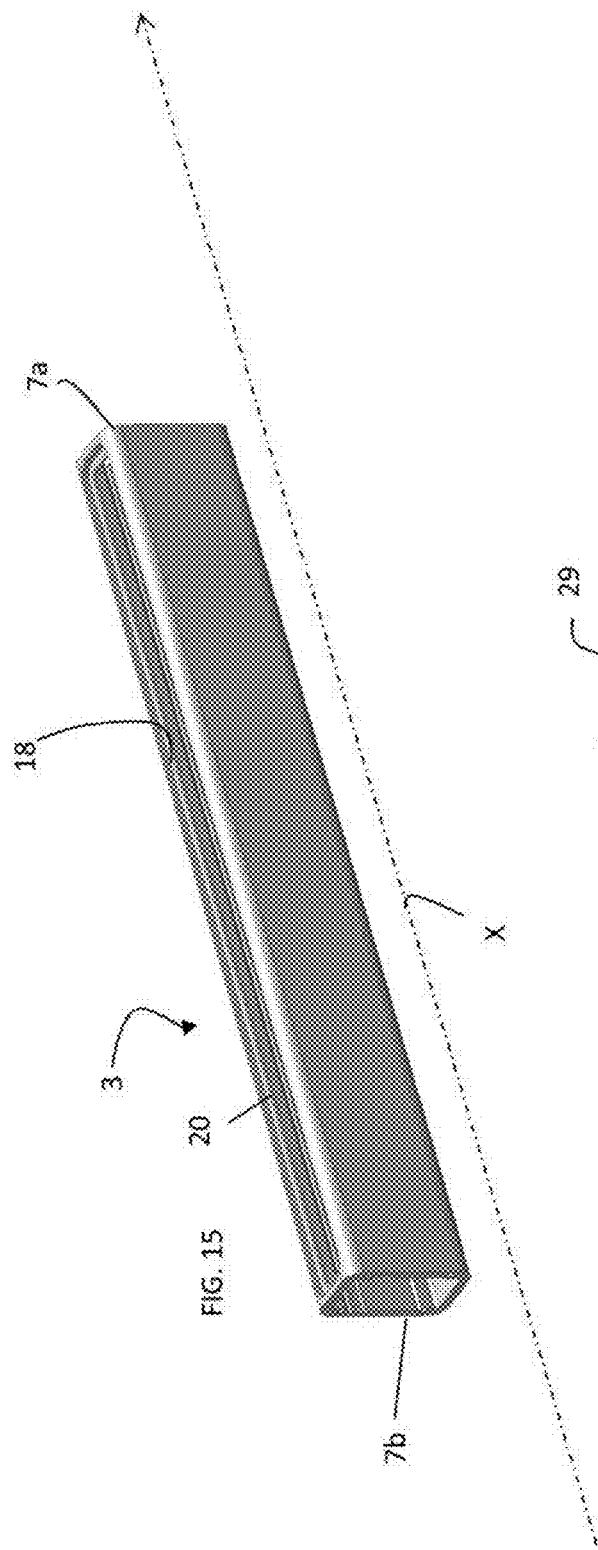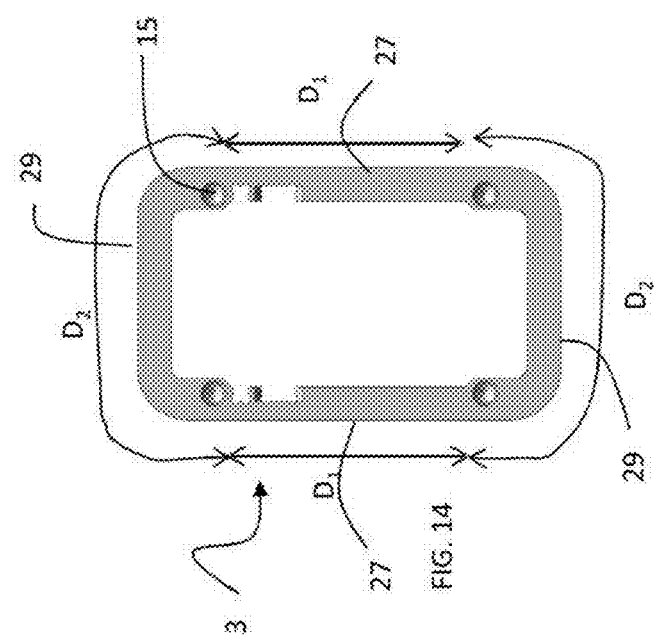

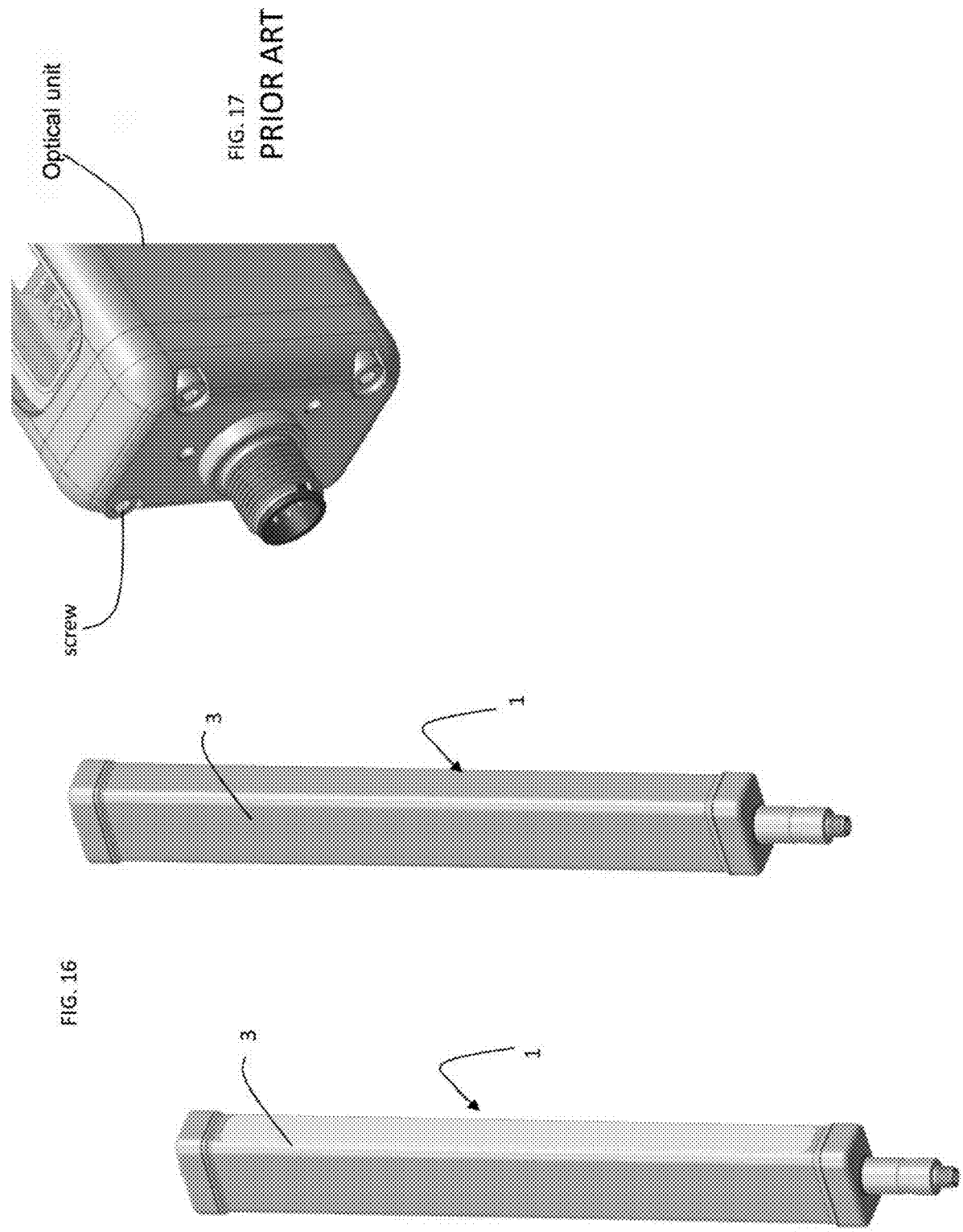

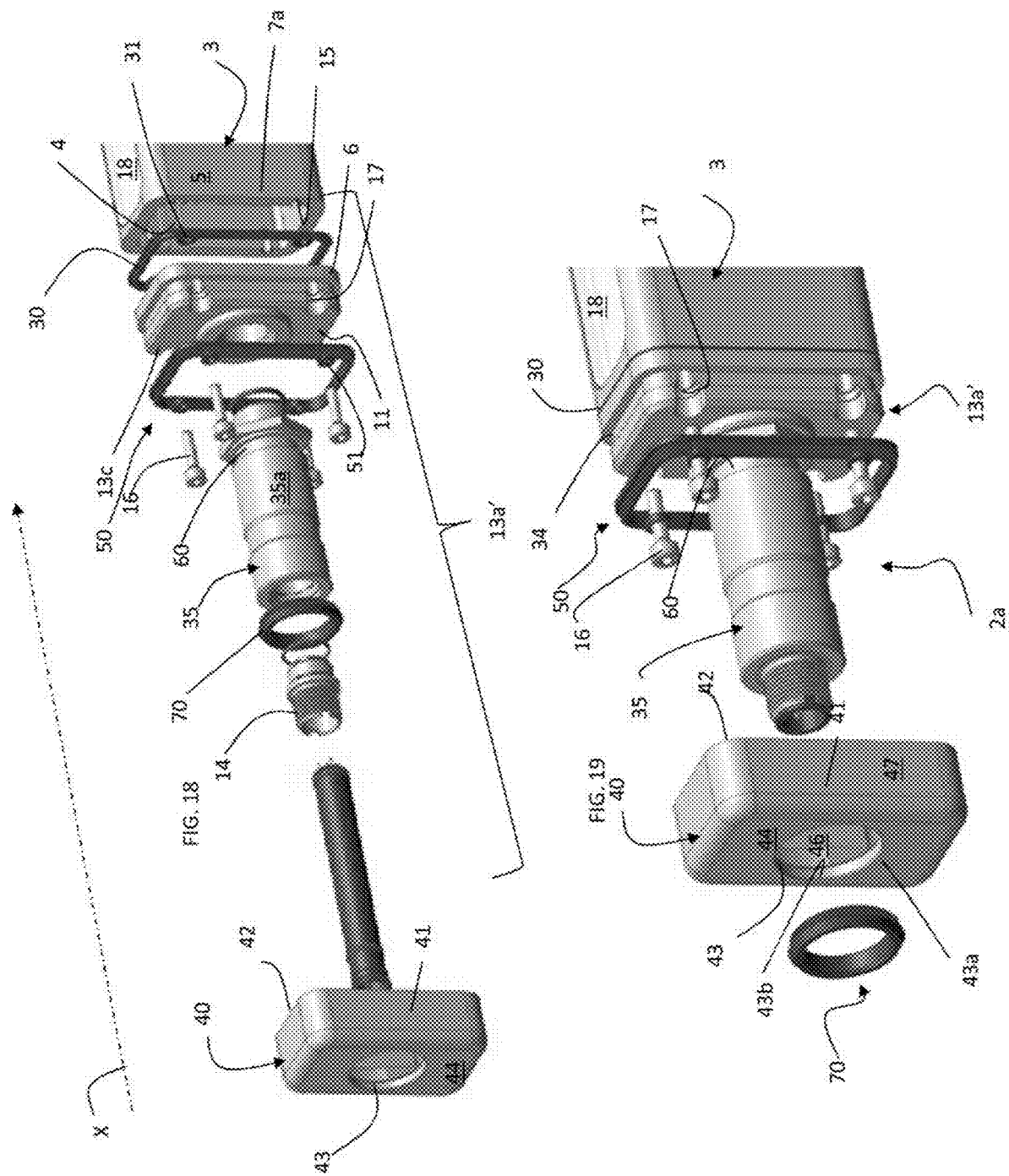

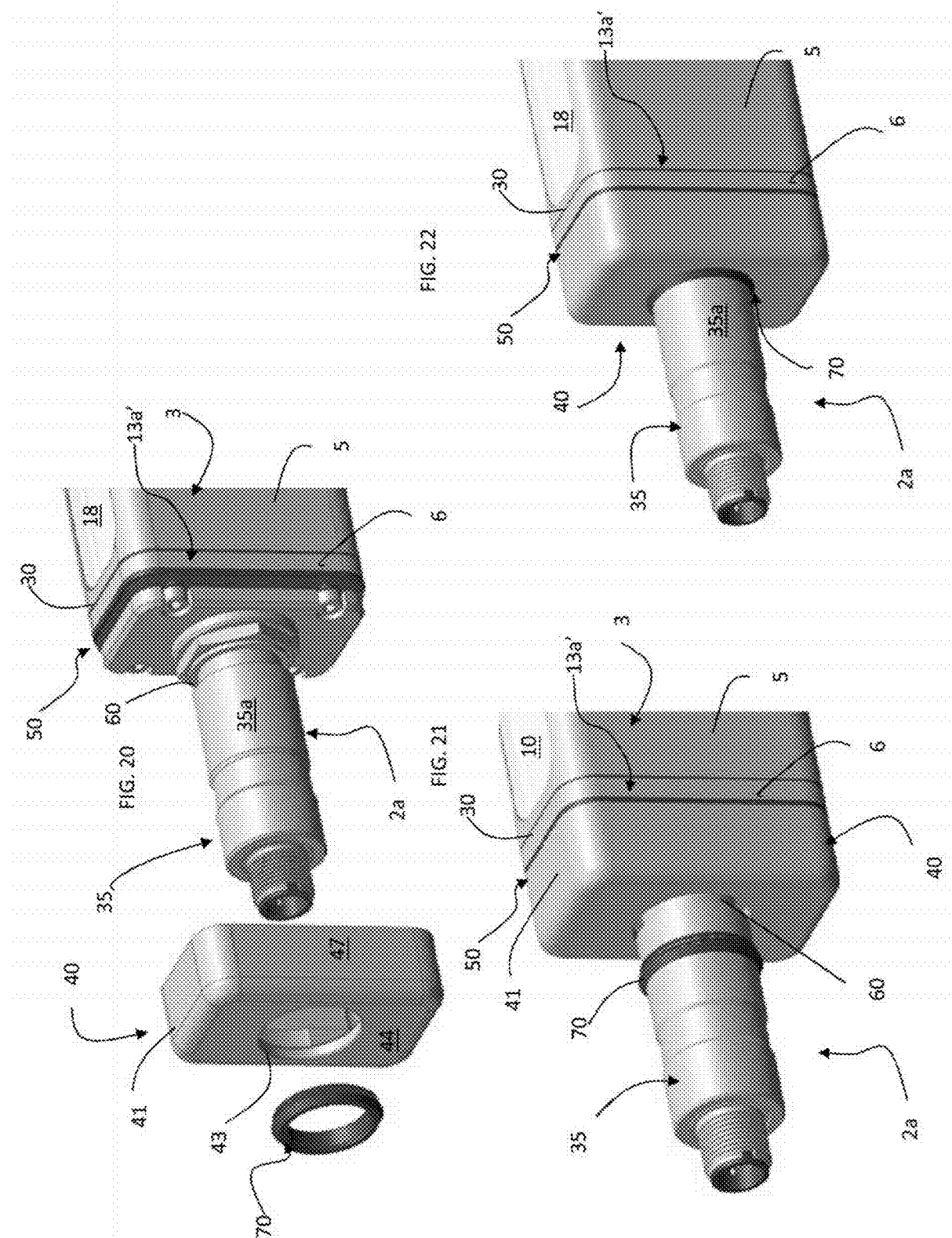

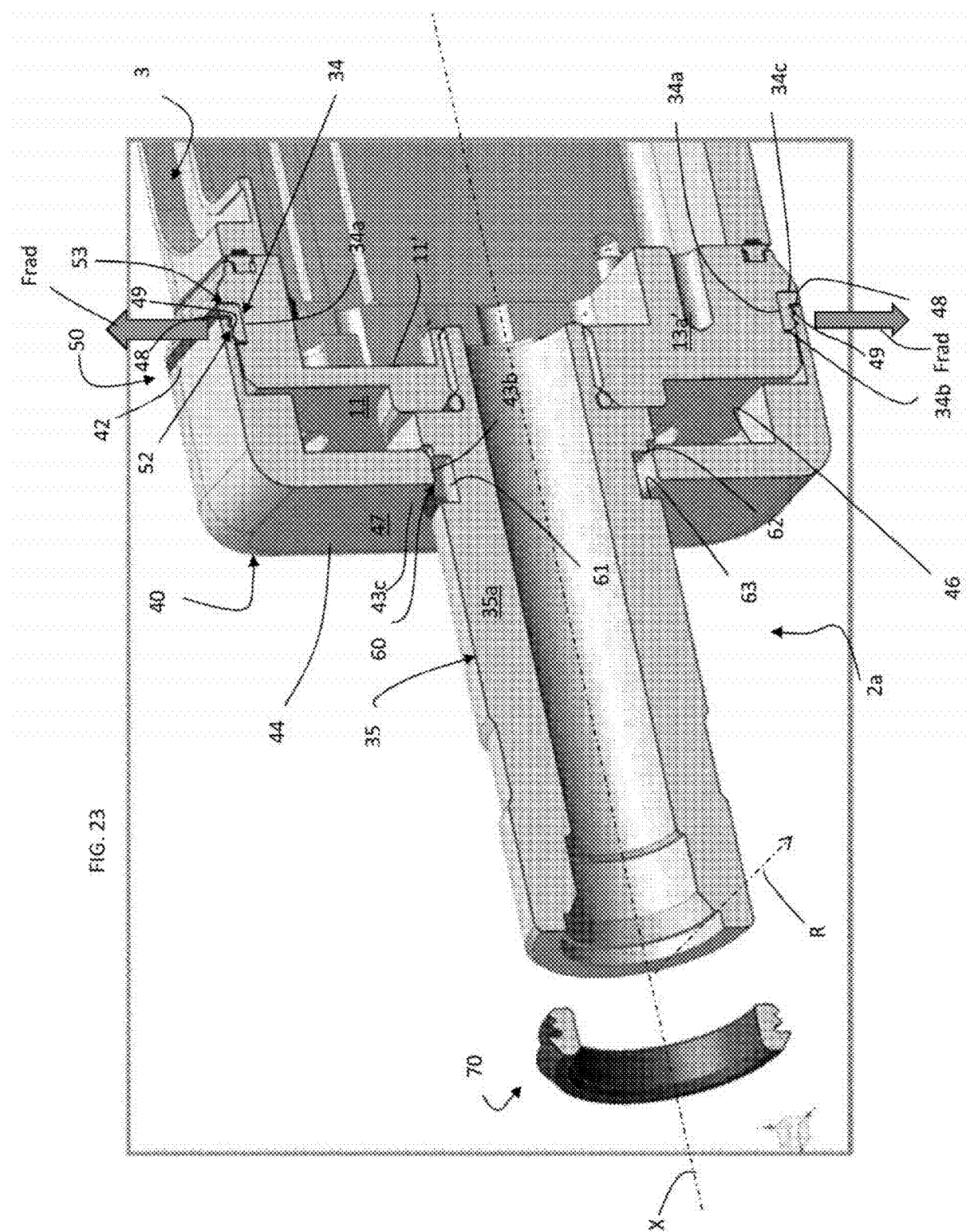

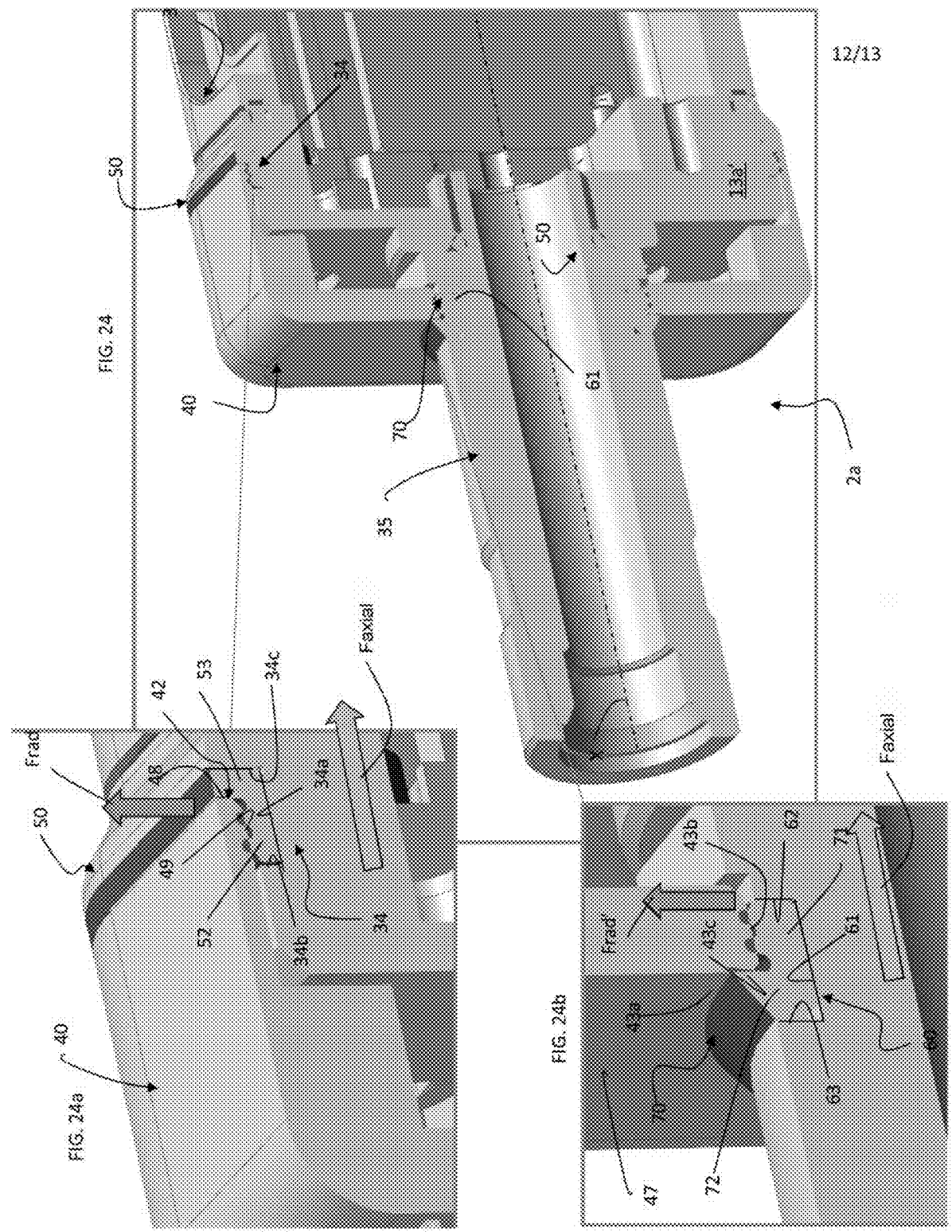

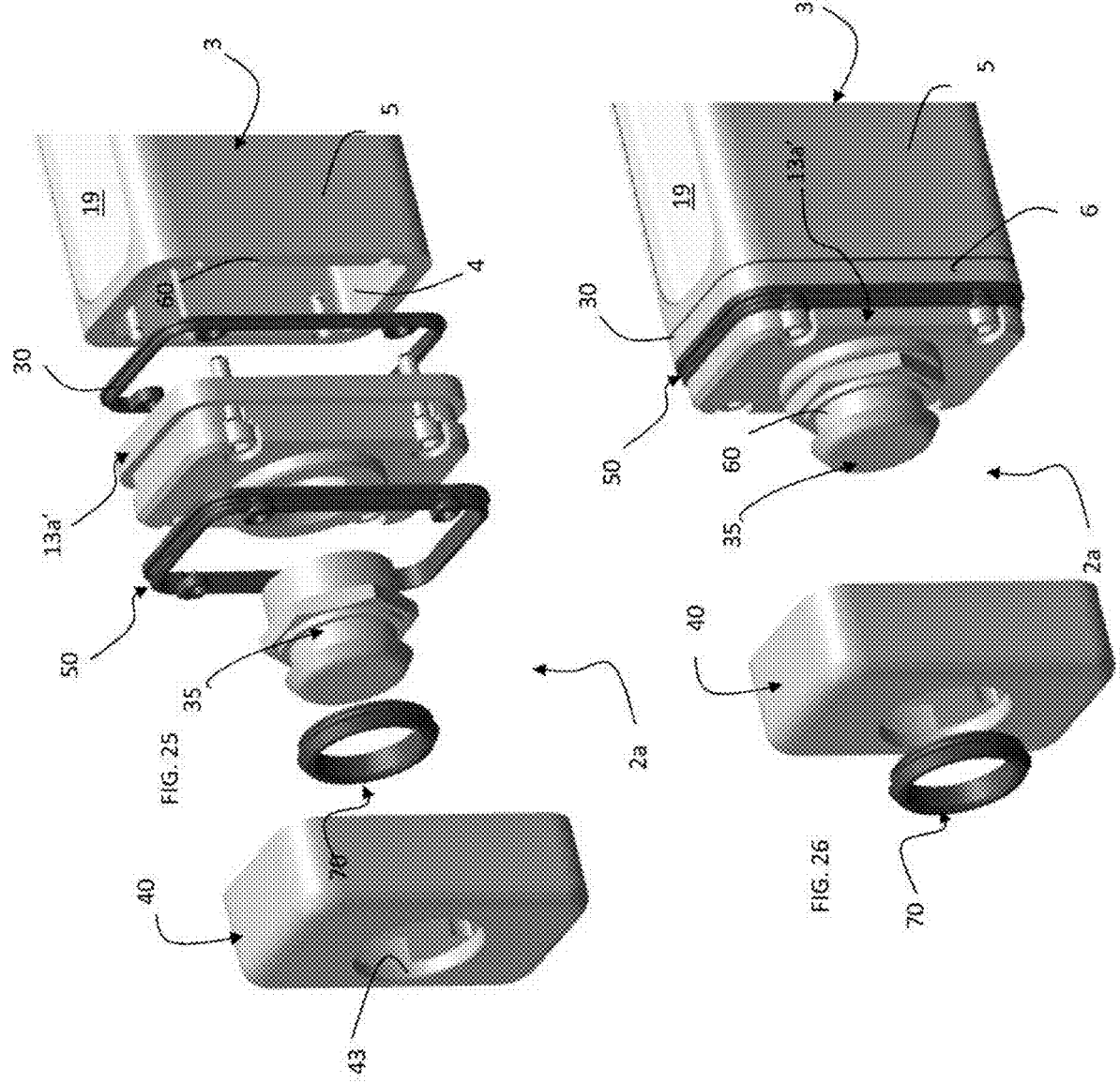

OPTICAL MODULE AND METHOD TO REALIZE AN OPTICAL MODULE

CROSS-REFERENCE TO RELATED APPLICATIONS

This application claims priority under 35 U.S.C. § 365 to PCT/IB2015/053676, which was filed on May 19, 2015, which claims priority to MI2014A000964, which was filed on May 21, 2014 and MI2014A02147, which was filed on Dec. 16, 2014. The entirety of the aforementioned applications is incorporated by reference herein.

TECHNICAL FIELD

The present invention relates to a light barrier and more in particular to an optical module for a light barrier suitable for securing and/or protecting and/or monitoring a zone or area. Furthermore, the invention relates to a manufacturing method for said module. One or more of these modules according to the invention can comprise, preferably in combination with a control module, an optical unit.

The module of the invention is preferably but not necessarily devised to be utilized in the pharmaceutical or food processing sector.

BACKGROUND OF THE INVENTION

Light barriers are known in the workplace safety sector.

Generally, they emit one or more light rays, which are generally referred to as light grid or light barrier.

Some types of light barrier are utilized to detect movement or the intrusion of a foreign body within a zone, such as for example the operating zone of a machinery, and can guarantee the protection of the operators working with the machinery or other industrial equipment. Other light barriers are implemented in order to control automated industrial processes and are used to verify the assembly process by counting the objects, recognizing the products being transported for example on a conveyor belt, recognizing irregular shapes, etc. Numerous other applications are possible. A non-exhaustive list includes for example:

Automated machines;
Packaging, goods handling and warehousing machines;
Textile, wood, and ceramic processing machines;
Automatic and semi-automatic assembly lines;
Automated warehouses.

In general, light barriers include two optical units, often called "bars"; one of the two units is the emitter while the other is the receiver. The two optical units can be coupled together; that is to say the same bar can include both the emitter and the receiver. For example, the same optical unit can include light emitters and light receivers.

Light barriers generally utilize visible spectrum or infrared light sources as the emitter. For example, said sources can include light emitting diodes (LED) mounted at a distance from each other along a transmitter bar that can be placed for example on one side of the monitored zone; photo-transistors, photo-diodes, or other photo-receivers can be used as the receiver elements, which can be mounted for example along a receiver bar on the opposite side of the monitored zone.

In a known example of operation of a light barrier represented in FIG. 1, the light sources in emitter bar TX emit beams of light towards the photo-receivers of receiver bar RX. In case one or more beams of light are blocked by an opaque object, such as for example the arm of an operator (indicated with a circle in FIG. 1), a control circuit—not illustrated—blocks the operating machine assigned to the worker, preventing the machine from proceeding with the work or protecting in some other manner the zone and the operator.

As stated above, this interruption can also be utilized to count objects or verify the entrance of goods into a particular zone.

The bars that comprise the optical units, that is to say the bars housing the light emitters and/or receivers, are generally manufactured in aluminum, since this material is easy to work using extrusion or wire drawing. Aluminum is a light, cheap, and easy to work material, and is hence employed to form the bars of the desired length and shape, such that light bars of different shapes and structures can be manufactured while maintaining the manufacturing costs under control, relatively speaking.

However particular sectors, such as for example the pharmaceutical and food processing sectors, require the use of bars comprising the optical units of the light barriers manufactured using a material that is more resistant than aluminum. In fact, in the presence of aggressive chemical agents, such as detergents, which are often used in these environments, aluminum can be easily damaged and does not meet the resistance standards required in these particular technical sectors.

In order to satisfy this requirement, a known method is to encapsulate the aluminum optical modules in tubular elements manufactured with a transparent material, such as for example glass tubes. The tubular element that contains the aluminum bar is then closed by means of metal elements, preferably hermetically in order to always meet the seal requirements in these special technical sectors.

However, the presence of these tubes manufactured with a transparent material implies first of all manufacturing another element in addition to the aluminum bar, increasing the cost and complexity of the assembly, as well as constraining the shape of the optical units, since large variations in the shape would imply an excessive number of different types of tube. Furthermore, glass tubes are extremely fragile to impacts and/or falls.

The solution to manufacture the bar for the optical unit with a material other than aluminum, which can meet by itself—without the use of the external tubes—the previously stated requirements, is generally rejected in the sector because materials such as stainless steel which would guarantee an adequate level of resistance against chemical agents in particular, are considered to be too expensive in the sector, in particular as a result of the time and cost required for their production. Therefore manufacturing a metal tube body starting from a stainless steel bar was considered in the sector to be an excessively expensive solution that would lead to manufacturing a light barrier with a cost that was outside the normally accepted range in the reference market.

Furthermore, particular sectors, such as for example the above mentioned pharmaceutical and food processing sectors, require that the bars comprising the optical units for the light barriers be provided with a seal and that they also be particularly easy to clean. In fact, these sectors employ liquids which are often corrosive, and which, if they find their way inside the bar, may damage the optics present within the bars. Additionally, in order to meet the sanitary regulations required in these particular technical sectors, it is preferable that no recesses or grooves be present in the external surface of the bars because they are difficult to clean and can become a bacterial growth site.

Typical bars according to the known art are illustrated for example in FIG. 17 (only the end of the bar is shown), where a plurality of locations for the screws is shown, which are the potentially difficult to clean zones. The screws are used to close an opening of the bar with a "plug", where the optics are inserted into the bar itself through said opening.

In order to meet this requirement, the bars in the prior art are provided with a closed tubular element where necessary in order to plug the different types of openings by means of plastic or metal elements, which preferably provide a seal in order to meet the seal requirements in these special technical sectors, and which are glued to the tubular element. The glue provides the possibility of avoiding mechanical components with recesses or grooves such as those in FIG. 17. However, the use of glue means the bars can no longer be opened in order to access the optics housed inside, or are otherwise difficult to open.

BRIEF SUMMARY OF THE INVENTION

The present invention relates to the implementation of a module for optical units suitable for housing an element provided with the function of emitter and/or receiver for a light barrier. The module includes a metal tubular body that does not require additional external tubes because it meets by itself the required resistance and/or seal characteristics. In particular, resistance is understood as resistance to the action of chemical agents, as required in the pharmaceutical and/or food processing sectors.

The module comprises a tubular body manufactured in stainless steel, in order to respect the required resistance. However, a main objective of the present invention is to implement said module for an optical unit that satisfies simultaneously both the above described resistance requirements and the requirement of reduced costs, preferably requiring a relatively short production time.

Said objectives are achieved by means of a module for the optical unit of a light barrier with a particular configuration of the tubular body that was manufactured starting from a stainless steel tubular body produced according to a technique that allows both implementing the desired configuration while maintaining the reduced costs. Furthermore, said objectives are achieved by means of a manufacturing method for said module. The configuration and the method for achieving it are relatively simple while at the same time requiring a short production time without excessively complex industrial machinery.

According to a first aspect, the invention relates to a method for manufacturing an optical module for an optical unit of a light barrier, wherein said method includes:

Arranging a tubular body including a stainless steel casing, wherein said casing defines an internal surface;

Reducing a thickness of a first section of said casing in a uniform way for a segment of length along a longitudinal axis of said casing up to a predetermined first thickness by means of wire-cut electrical discharge machining;

Inserting a support holding an electromagnetic radiation emitter and/or a receiver in said casing.

According to a second aspect, the invention relates to a method for manufacturing an optical module for an optical unit of a light barrier, wherein said method includes:

Arranging at least two bent stainless steel plates in order to form a first and a second element;

Coupling said first and said second elements together;

Welding said first and said second elements together in order to form a tubular body defining an internal surface and a longitudinal axis;

Inserting a radiation emitter and/or receiver in said tubular body for transmitting and/or receiving radiation comprising said light barrier; and Closing said tubular body at a first and a second end by means of a first and a second end element, respectively.

According to a third aspect, the invention relates to an optical module for an optical unit of a light barrier, wherein said module includes:

At least one radiation emitter and/or receiver for transmitting and/or receiving radiation comprising said light barrier;

A support on which said emitter and/or receiver is/are mounted;

A tubular body suitable for housing said radiation emitter and/or receiver, wherein said tubular body defines a longitudinal axis and includes a stainless steel casing that defines a length along the longitudinal axis of the tubular body, a thickness in the cross-section perpendicular to the longitudinal axis, and an internal surface;

Wherein said casing includes

A first and a second end opposed lengthwise;

A first and a second groove built in said internal surface facing each other with respect to a plane crossing said longitudinal axis where said support is inserted;

A first portion of the casing having a substantially uniform first thickness along a segment of said length of said casing;

A second portion of the casing having a substantially uniform second thickness along a segment of said length of said casing, wherein said second thickness is greater than said first thickness;

At least one hole oriented in a direction substantially parallel to said longitudinal axis, corresponding to said second portion and open in said first or second end.

According to a fourth aspect, the invention relates to an optical module for an optical unit of a light barrier, wherein said module includes:

At least one radiation emitter and/or receiver for transmitting and/or receiving radiation comprising said light barrier;

A tubular body suitable for housing said radiation emitter and/or receiver, wherein said tubular body comprises a first and a second element welded together to form said tubular body, wherein said first and second elements are manufactured in stainless steel; and A first and a second end element fastened to a first and a second end, respectively, of said tubular body closing it thereto.

The module for obtaining an optical unit in the invention according to the third and fourth aspect and/or manufactured according to the method of the invention according to the first and second aspects, can be utilized for implementing any light barrier independently of its geometry. Furthermore, it can be utilized for implementing the optical module for emitting the light barrier, for the optical module for receiving the light barrier, and for the optical modules that house both the emitter and the receiver elements.

Moreover, the length (in other words the main dimension) of the module according to the third and the fourth aspect can be arbitrary and easily adjusted, as described hereinafter, such that it can house a variable number of emitter and/or receiver elements.

The "starting piece" for manufacturing the module according to the invention is different for the first and the second aspect.

In the first aspect, the "starting piece" is a semi-finished casting product from which the module of an optical unit is obtained according to the invention by means of—inter alia—wire-cut electrical discharge machining. Therefore, the starting "piece" or semi-finished product can include an elongated solid body from which the tubular body is obtained by removing the material by electrical discharge machining, or already the tubular body itself.

Therefore, in the first and third aspects of the invention, the tubular body provided with a closed casing or "wall" is the starting element of the present invention. Said tubular body is manufactured in stainless steel and can be a segment of pipe available on the market. Because steel pipes are available on the market in a relatively large range of varieties, it is possible to select a tubular body with the desired cross-section and/or length. However as was previously stated, it is also possible to manufacture the tubular element or body directly in a stage before the method of the invention, starting from a solid bar that is "hollowed out" by wire-cut electrical discharge machining. Moreover, the transversal cross-section of the tubular body can have any desired geometry.

The optical elements are inserted into the tubular body, that is to say for example the receiver element, the emitter element, or both. Furthermore, several receiver and/or emitter elements can be present inside the same tubular body.

The tubular casing has a main dimension or length L along the axis of the casing itself, indicated hereinafter by X. The tubular casing can be built as a single piece, that is to say a single element with a solid wall, or else comprise several pieces fastened together. The assembly method or means of forming the tubular body is not relevant for the purposes of applying the first aspect of the invention.

The casing therefore presents a length L and a thickness T that is in general preferably uniform along the entire length L and is moreover preferably uniform along a cross-section in a plane perpendicular to the longitudinal axis X, before the subsequent processing steps described hereinafter. Casings provided with an initial non-uniform thickness, both along the length and the cross-section, can however be employed in the present invention thanks to the type of machining carried out.

By means of the wire-cut electrical discharge machining, a portion with reduced thickness is created inside the casing of the tubular body. Wire-cut electrical discharge machining permits working very hard materials such as steel and can moreover substantially create any geometric shape or volume. In this type of processing a conducting wire is utilized as the electrode to cut or shape the tubular body. Therefore, in order to carry out the machining the wire can also be inserted within a closed volume, such as that present within the tubular body, which can hence be manufactured as a single piece. In this manner—in a relatively simple manner—it is possible to define the thickness of the casing at every point of the transversal cross-section.

Given the type of machining, this thickness is preferably formed uniformly along the entire length of the tubular body, that is to say the reduced thickness is formed along the entire length L.

The first aspect of the invention also provides for the formation of a plurality of different thicknesses inside the casing. For example a first segment preferably, but not necessarily, of length L can be formed with a first thickness; a second segment preferably, but not necessarily, also of length L can be formed with a second thickness greater than the first thickness; and a third segment preferably, but not necessarily, also of length L can be formed with a third thickness greater than the first and the second thicknesses. Any combination of thicknesses is possible thanks to the type of machining carried out.

Because in wire-cur electrical discharge machining the wire that performs the electrical discharge machining is placed inside the solid bar or tubular body, the material is removed from the entire length of the bar or tubular body into which the wire is inserted. However, in the first and third aspects of a preferred embodiment of the invention the tubular body is not manufactured as a single piece, but comprises several tubular elements coupled to each other "in series". Therefore in this case each tubular element comprising the final tubular body can undergo different (or equal) electrical discharge machining with respect to the other elements and therefore the variations in thickness can be carried out differently in each single element and not necessarily for the entire tubular body, resulting for example in a change of thickness for only a segment of length L—equal to the length of the tubular element—of the final tubular element.

In this manner it is possible to maintain a relatively large thickness where necessary according to the requirements of the construction details, because for example in this position additional processing steps, such as drilling a hole, are necessary or preferred, and a relatively small thickness where allowed. In this manner the ideal amount of material can be configured, therefore obtaining at the same time lightness and strength, wherein it is possible to modulate the cross-section of the casing as desired thanks to wire-cut electrical discharge machining.

By means of the method in the first and third aspects of the invention, a module is constructed with a tubular body the cross-section of which presents portions of larger or smaller thickness. The regions of larger thickness can for example be utilized to locate holes for additional fastening elements, such as for example screws.

Furthermore, electrical discharge machining permits creating slots, seats, and grooves in the casing. For example, a groove holding a support for the emitter or the receiver o radiation can be implemented anywhere inside the casing.

Moreover by means of the first aspect, it is possible to reduce the production costs because it is possible to start by processing a tubular body or solid bar available on the market, which are generally manufactured in a plurality of thicknesses and/or lengths according to the applicable standards for said tubular body or bar, and modify the tubular body or bar to the desired thickness, also segment-wise. Therefore, the cost of "non-standard" tooling is eliminated.

According to the second and fourth aspects of the invention, as opposed to the first and third aspects where how the tubular body is produced is unimportant, the solid stainless steel bar where a recess is created in order to house the light emitter or receiver comprising the optical unit of the light barrier or the tubular body assembled as a single piece, are not machined directly. The "starting piece" or semi-finished casting product, on which the method of the invention is applied according to the second aspect, is a stainless steel plate or sheet. Two distinct elements are utilized from this plate or sheet, which are then coupled in order to form the tubular body housing the parts.

The two distinct elements are manufactured in stainless steel, however the use of two elements that only need to be bent in order to create the desired shape significantly reduces the production time with respect to machining a steel bar. In fact, two "semi" tubular bodies are obtained by bending the two elements, which when coupled together substantially form an almost complete semi-finished tubular body without the complex production and long time to machine the material.

The plate from which the two elements are obtained is preferably of a standard type, such as for example a piece of sheet metal available on the market. According to the dimension of the sheet, that is to say the width of the plate, tubular bodies of varying length are obtained; therefore, by suitably choosing the sheet it is possible to easily vary the length of the tubular body obtained by coupling the two elements.

The two elements are welded to each other in order to form the tubular body and thus substantially obtain the same resistance and rigidity to torsion that would be obtained by utilizing a tubular body in a single piece. Furthermore, the weld also guarantees the seal against seepage.

Moreover, the tubular body is preferably produced by welding two elements that are substantially identical in terms of shape and dimensions. In this manner it is possible to initially create a single semi-finished element by bending the stainless steel plate and then coupling it to another identical semi-finished element in order to form the complete tubular body. In this manner, the production time is minimized because a single semi-finished product needs to be manufactured. Subsequently, other additional processing steps can be carried out on the two semi-finished pieces in order to make them different from each other.

Preferably, the weld is carried out along the entire line of the junction between the first and the second element. Preferably, there are two substantially straight lines of the junction when said first and said second elements are coupled to each other; these lines represent the region of contact between the edges of the first and the second element.

In this tubular body implemented in this manner by coupling and welding the two elements, the emitter or plurality of emitters and/or the receiver and/or plurality of receivers is inserted.

Additional processing steps on the tubular body obtained according to the second and/or the fourth aspect can be carried out by means of wire-cut electrical discharge machining, as described in reference to the first and/or third aspects. In other words, the electrical discharge machining method can also be applied when the starting element is a steel plate.

Moreover, also according to the second and fourth aspects of the invention, the tubular body can present cross-sections of different thickness, which can be created for example by means of wire-cut electrical discharge machining, or other method such as for example milling. Hence, in a variant of the invention, the method according to the second aspect can include the step of uniformly reducing the thickness of a first portion of said casing up to a predetermined first thickness for a segment of length along a longitudinal axis of said casing.

According to all the aspects described above, from the first to the fourth, the tubular body is then preferably enclosed at the two ends by means of two end elements. Preferably, in a first embodiment, said end elements have a shape substantially analogous to those already in use in the sector of optical units for light barriers, so that no additional components need to be manufactured with respect to those already in production. In a second embodiment, the end elements are manufactured as described in reference to the fifth, sixth, and seventh aspects of the invention.

According to all the aspects of the invention, the end elements can be coupled in turn to fastening brackets in order to fasten the constructed optical unit in the desired position, such as for example for protecting a determined working zone. Furthermore, one or more electrical connectors are preferably present in one or both end elements for electrically connecting the emitters and/or receivers present inside the tubular body. Furthermore, a connector for creating the electrical connection to ground can be present.

According to the first, second, third, and fourth aspects, the invention can include one or more of the following aspects, whether in combination or in alternative:

According to the first aspect, the method preferably includes:

Reducing a first thickness of a first section of said casing in a uniform manner for the entire length along a longitudinal axis of said casing up to a predetermined thickness by means of wire-cut electrical discharge machining.

Similarly, according to the third aspect, said first and/or second portion in the optical module preferably has a first thickness and/or a second thickness, respectively, which are substantially uniform along said entire length of said casing.

As previously stated, when wire-cut electrical discharge machining is utilized, it is preferred to machine the entire length of the tubular body to the same extent; for example machining the same thickness along the entire length L or the same groove provided with the same shape, because with electrical discharge machining the wire is inserted within the tubular body itself or creates the tubular body starting from a solid bar.

According to the first and seconds aspects, the method advantageously provides for creating a first groove in said internal surface.

According to the third and fourth aspects, the tubular body advantageously includes an internal surface where a first groove is created.

More preferably, in all four aspects said groove extends for most of the longitudinal axis of said tubular body.

More preferably, according to the first and second aspects the method provides for the creation of a first and a second groove substantially facing each other in said internal surface.

According to all four aspects of the invention, the first and/or second groove can be created by means of different techniques.

In a first embodiment, the tubular body is preferably machined, preferably by means of milling; that is to say by means of a lathe or milling machine, in order to create the first groove and potentially any additional grooves. For example, when the tubular body is created from two elements facing each other (second and fourth aspects of the invention), the grooves can be created by milling on both elements.

According to the second aspect, in this last preferred embodiment when the tubular body is created by means of two separate elements, wherein said first and second element each define an internal surface facing each other, the method of the invention includes:

Creating a first groove in said internal surface of said first element and a second groove in said internal surface of said second element.

More preferably, the method includes:

Creating a first groove in said internal surface of said first element and a second groove in said internal surface of said second element, wherein said first and said second grooves are coplanar.

In a preferred embodiment of the second and fourth aspects, the groove in the tubular body is created before welding together the two elements formed from the plates, and is created in the internal surface of one or both elements. The internal surfaces of the first and second elements, that is to say the internal surface of the first element and/or the internal surface of the second element, which form the internal surface of the tubular body when the two elements are welded together, are the surfaces of the first element and the second element which face each other when the two elements are coupled.

More preferably, in both the first and second aspects the method includes the stages of:
   inserting a support for said radiation emitter and/or receiver inside said first and/or second groove.

This groove is employed as a guide and support for a support of the emitter and/or receiver element(s) of the light of the barrier. In this manner the placement and/or alignment of the emitter and/or receiver is particularly simple. In fact, the groove can be placed in the internal surface with a high degree of precision, implying the precise placement of the inserted emitter and/or receiver upon its insertion.

Moreover, the creation of said groove on the internal surface of the first and/or second element does not require a particularly long time to machine.

In a second preferred embodiment, in any of the aspects of the invention, the first and/or second groove(s) can be created by means of wire-cut electrical discharge machining instead of milling.

In this last case, the first and/or second grooves are preferably created along the entire length L of the tubular body. The groove can have any desired geometric shape thanks to the flexibility of the electrical discharge machining method.

For example, in all of the aspects of the invention said support inserted into the groove(s) can be an integrated circuit (PCB—Printed Circuit Board) where the emitter and/or receiver are both mounted.

Preferably, the tubular body houses additional PCBs, such as for example those related to a display and/or LED for displaying the status of the optical unit and related electronics.

According to the first and second aspects of the invention, the method includes:
   Creating said first groove so that a first and second surface of said first groove, which intersect each other at an angle, are joined by a substantially cylindrical portion of surface.

Therefore, in this preferred embodiment according to the third and fourth aspect, the module includes a first groove comprising a first and a second surface arranged with respect to each other at an angle and joined by a cylindrical portion of surface.

This design of the groove takes into account the aspects of wire-cut electrical discharge machining, which does not create "right" angles in the surfaces as a result of being precisely a type of machining carried out by means of a wire acting as the electrode cutting and removing the material, but results in curved surfaces as a result of the shape of the actual wire utilized in the machining process. Therefore taking into account the specific characteristics of the type of machining employed in the design of the optical module, i.e. including "curved" profiles in the design of the grooves, simplifies the machining process itself.

In a preferred embodiment, the first and second aspects of the method moreover include closing the tubular body in a first and a second end of the tubular body by means of a first and second end element, respectively.

Closing the tubular body prevents the entrance of undesired elements inside the tubular body itself, wherein the undesired elements can soil and/or damage the internal optics.

Furthermore, other processing steps can be carried out on the box body, in correspondence with the two distal ends of the tubular body on which the end elements are fastened according to an embodiment. For example, one or more threaded holes can be created in order to fasten the end element, for example by means of screws. The end element in turn preferably includes through holes suitable for engaging the screws.

Preferably, the distal elements are fastened to the tubular body by means of screws and a seal gasket interposed between each distal element and the box body.

According to the first aspect, the method includes:
   Perforating said casing in a second portion of the casing at a distance from a first or second end of the casing not including said first portion.

In the first aspect of the invention, wire-cut electrical discharge machining is utilized to reduce the thickness of the cross-section of the casing. However, some zones of the cross-section of the casing are left with a relatively "high" thickness precisely in order to allow the carrying out of additional processing steps that could somehow weaken the casing, such as for example creating the holes for the screws, which preferably need a higher thickness in the cross-section of the casing. Therefore, thanks to the invention, the thickness of the casing is chosen segment by segment in accordance with the overall type of processing that the segment of the casing will undergo.

More preferably, perforating said casing includes perforating said casing in a direction substantially parallel to said longitudinal axis.

In a preferred embodiment, according to all the aspects of the invention, a third and fourth groove are created in the casing, and more preferably in a direction parallel to the first and second grooves.

These additional grooves, which can be "blind" grooves that do not extend from one end of the tubular body to the other, but only for a segment of the length L of the tubular body, and which start from a distal end of the tubular body along the internal surface of the tubular body itself for said segment, are suitable for creating guides for additional supports for electronics and/or PCBs. These blind grooves can be created by means of electrical discharge machining only if the tubular body includes several elements fastened to each other "in series". Otherwise, the electrical discharge machining creates the grooves for the entire length L of the tubular body.

Preferably, according to all four aspects mentioned above, the module includes an opening in said tubular body in order to create a window for said emitter and/or receiver.

Preferably, according to the first or second aspects the method includes:
   Machining said tubular body in order to create a window.

In order to allow the light radiation emitted from the emitter to leave the tubular body and/or to allow said light to reach the receiver, such as for example a photo-detector, an opening is preferably created in the tubular body itself, in particular in a position matching the position of the emitter and/or receiver housed in the tubular body itself, denominated the window.

More preferably, according to all four aspects, the module includes a plate manufactured with a transparent material in order to close said window.

In order to protect the emitter and/or the receiver and/or the circuits present inside the tubular body, the window is preferably closed by means of a body that is transparent to the electromagnetic radiation emitted and/or received, hence for example a plate manufactured in a transparent material.

More preferably, according to the second and fourth aspects, said opening in said tubular body is created for a first portion in said first element and for a second portion in said second element.

More preferably, according to the second and fourth aspects the method includes:

Creating said window part in said first and part in said second element following the weld of said first and said second elements.

The window is preferably created when the two elements are already fastened and/or welded to each other, that is after the tubular body has been formed. This prevents the need to also align the edges of the two "semi-windows" potentially created in the first and second element; that is to say creating the window after welding instead of on the two semi-finished pieces enables greater precision.

Furthermore, the fact that the first and second elements are welded to each other enables creating the window by cutting or removing the material as if the tubular element were manufactured in a single piece, since the preferred weld along the entire length of the junction between the first and second elements creates a rigid tubular element.

In a preferred embodiment, said module comprises a flange, wherein said flange borders at least part of said window and includes a seat for applying the glue.

More preferably, according to the four aspects of the invention, said method includes the step of:

Gluing a transparent plate on said flange of said window.

In order to correctly place the transparent plate on the tubular body, the window is bordered around its perimeter, and preferably along the entire perimeter, by a flange on which the transparent plate is placed.

Preferably, according to all four aspects, the plate is manufactured with glass, PMMA (poly-methyl methacrylate), or PC (polycarbonate).

In a preferred embodiment, according to the first or second aspects, the step of the creation of said window in said method includes:

Machining said tubular body so that at least part of the perimeter of said window is surrounded by a flange that includes a seat for applying the glue.

Gluing by means of a suitable glue applied in the seat created in the flange is preferred in order to fasten the transparent plate to the tubular body. For example, the seat can be shaped as a channel on the flange, which is also present along the entire perimeter of the window. Because the glue allows sealing the window by means of the plate, together with the weld this allows obtaining a module that meets the requirements for obtaining the protection of type IP65 or IP69K.

Advantageously, according to the second and fourth aspects the method includes the step of arranging the bent plates:

Arrange at least one of said bent plates in order to form a first and/or a second element provided with a cross-section shaped as a C or U in a plane substantially perpendicular to a principal dimension of said tubular body.

According to both the second and the fourth aspects, the shape given to each element comprising the tubular body is designed to simplify their coupling. In other words, a tubular body is easily formed by coupling together two elements featuring a C or U shaped cross-section. The profile of the cross-section shaped as a C or U permits the formation of the tubular body by means of only two elements thus minimizing the machining work needed. Moreover before the addition of the means for coupling them, the two starting elements can be identical; that is to say two equal elements can be created and then welded together, providing in this manner a rapid production process with a single intermediate semi-finished casting product (the element that is utilized twice).

Furthermore, this C or U shaped section is easy to manufacture by simply bending the stainless steel plate or sheet.

Alternatively, a different profile can be utilized in case a particular optical unit geometry is required. However, according to the invention it is preferable to utilize those profiles that can be obtained by simply bending the stainless steel plate. A possible profile is for example shaped as an L.

Advantageously, according to the second aspect in the method of the invention, said stage wherein said first and said second elements are coupled to each other includes coupling said first and said second elements by interference fit.

Before carrying out the weld it is preferable that the first and second elements comprising the tubular body are solidly coupled to each other, for example by means of interference fit. Coupling by interference fit is preferred in order to ensure a precise fit of the two halves (that is to say the two elements), and in particular the arms of the "C" or "U" of the first element with those of the second element.

In a preferred embodiment, in the fourth aspect, said first and/or second elements include one or more pins for coupling by means of interference fit with the other one of said first and second elements.

More preferably, said first and/or second elements include one or more seats for receiving said one or more pins by interference fit.

The creation of a plurality of pins and the corresponding seats, and in particular, a plurality of pins in each first and second elements, as well as a plurality of seats in the first and second elements, ensure a simple and precise reference system for coupling the two elements. Preferably, the pins and seats are created in relation to the two free edges (first and second edge) of the first element and the second element, which are facing each other during the assembly stage and are then brought into contact before being welded. Said seats/pins are preferably formed with a spacing between them, such as for example with a pitch, more preferably alternating seat/pin, along the entire free edge, both the first and the second, of the first and second elements.

Alternatively, all the pins are created on the first and second edges of the first element, while all the seats are created in the first and second edges of the second element.

Preferably, in the second aspect, said step of arranging at least two bent stainless steel plates in order to form a first and a second element includes:

Arranging at least two stainless steel plates;
Bending said at least two plates to form a first and a second element.

In other words, the starting material of the method of the invention can be the steel plate that is bent according to the preferred geometric shape, or an already bent semi-finished casting product that is subsequently processed according to the method of the invention.

In a preferred embodiment, the module according to the first four aspects of the invention described above can be closed at the ends.

Preferably, in all four aspects of the invention, said first and said second end elements are manufactured in stainless steel.

Preferably, in said first and second aspects, said step of closing said tubular body at the ends by means of a first and a second end element includes:

Interposing a gasket between said first and/or said second end element and a corresponding first and/or second end of said tubular body.

In order to obtain an excellent seal in the overall module, for example, in order to meet the class of protection IP65 or IP69K for liquid and solid seepage, and/or at the same time obtaining resistance against chemical agents through all the parts of the module, it is preferred to manufacture the overall module, that is to say also including the end portions such as the end elements, in stainless steel and/or fasten said end portions to the rest of the tubular body by interposing a gasket.

Alternatively, in all the aspects of the invention, said end elements can be welded to the box body.

Preferably, in all four aspects of the invention, according to the AISI notation said stainless steel belongs to the 3xx series.

More preferably, according to the AISI notation said stainless steel is of type 316L.

There are several types of stainless steel available on the market, which are mainly known by the AISI (American Iron and Steel Institute) steel notation. The AISI notation identifies the stainless steel by means of a number system with three numbers and the potential addition of a letter. The first of these numbers indicates the class of steel. In the invention, the series 3xx steel indicates:

Series 3xx—chrome-nickel and chrome-nickel-molybdenum austenitic steel

On the other hand, the addition of a letter, as in the preferred type of steel in the invention, indicates:

The letter "L" indicates the low carbon percentage (Low Carbon) present. This characteristic causes the steel to bind less gas, since under all conditions carbon tends to bind with hydrogen, causing the precipitation of hydrocarbons; the presence of hydrogen has often a negative effect on steel, at high temperatures and most of all under conditions of ionization (ionizing radiation). The ionized hydrogen atom ($H^+$) is very small, so that at high temperatures it is very mobile in the steel lattice, so that it runs the risk of accumulating and causing dangerous discontinuities. The low carbon content also allows good welds even for thicknesses >6 mm.

This type of stainless steel is one of the most requested in the pharmaceutical industry.

Advantageously, in the second and fourth aspects, said first and/or second elements are shaped with a cross-section shaped as a C or U in a plane substantially perpendicular to a principal dimension of said tubular body.

The present invention moreover relates to an optical unit that includes a tubular body, such as for example the tubular body described in connection with the first to fourth aspects, suitable for housing one or more optoelectronic devices inside, such as for example the elements operating as the emitter and/or receiver for a light barrier. However, other functions of the optical unit can be provided. The optical unit comprises a tubular body that is closed hermetically on at least one of the two ends in order to meet the requested resistance and/or seal characteristics. Closing the unit by means of a so-called "plug" is needed as a result of the presence of an opening in the unit for inserting the optics in the tubular body. Moreover, the external surface of the tubular body of the invention is preferably "smooth", wherein smooth is meant as free of grooves, seats, or recesses, which could limit the possibility of cleaning the tubular body. The tubular body serves the function of a shell for the components inside it.

However, the optical unit does not require gluing several components to its tubular body. For example, considering the tubular body and the end elements, these are not glued to the tubular body. The optical unit can be closed in a reversible manner.

Said objectives are achieved by means of an optical unit that comprises a cover element for the end of the tubular body that includes the closing "plug"—and hence the "seats" as illustrated in FIG. 17—having a particular configuration. This end cover element is suitable for covering all the potential grooves and seats of the mechanical couplings devised for the stability of the tubular body, and is coupled to the other piece of the tubular body without glue.

According to a fifth aspect, the invention relates to an optical unit that includes:

A tubular body suitable for housing one or more optical components, comprising a first end that can be opened to insert one or more of said components, and a first end element including a protruding body, in correspondence with said first end;

A cover element for said end comprising a through hole suitable for letting the protruding body out through said cover element when said cover element is coupled to said tubular body in order to cover said end;

A sealing system for the hermetic cover of said end by means of said cover element;

Wherein said sealing system comprises:

A first sealing element interposed by crimping and compression between a perimeter edge of said cover element and said end element, so that a first portion of said first said sealing element is interposed between a first surface of the perimeter edge of said cover element and a first surface of said end element, generating a compression force along a radial direction;

A second sealing element interposed by crimping and compression between said protruding body and a perimeter edge of said through hole in said cover element, so that a first portion of said second sealing element is interposed between a first surface of a casing of said protruding body and a first surface of said perimeter edge of said through hole in said cover element, generating a compression force along an axial direction; and wherein said axial direction and said radial direction cross each other.

The optical unit of the invention can be utilized for the creation of any optoelectronic system, such as for example an optoelectronic sensor. A preferred embodiment is for example a light barrier that is independent of its shape. Said unit in this example can include an optical module for emitting the light barrier, the optical module for receiving the light barrier, as well as optical modules that house both the emitter and the receiver elements.

The unit includes a tubular body suitable for protecting the optics inside. Said optics can be of any kind, such as for example emitters and/or receivers of electromagnetic radiation. Being of any kind and/or known in the reference sector, the internal optics will not be described further hereinafter.

The tubular body employed is substantially a protecting shell, the shape of which, dimensions, and manufacturing material depend on the type of use of the optoelectronic system, such as for example on the type of surrounding environment in which the optics are placed. Moreover, the dimensions of the tubular body depend on the number and dimensions of the optical components inside. Furthermore, the tubular body preferably includes a window closed by a material transparent to the electromagnetic radiation potentially transmitted or received by the optical and/or optoelectronic components present in the tubular body.

Preferably, the tubular body is manufactured according to the first, second, third, or fourth aspect of the invention.

In order to insert the optics, such as for example the optoelectronic components mentioned above, inside the tubular body, the tubular body comprises at least one opening that must be closed during the normal use of the unit. The opening is placed at one of the ends of the tubular body. The tubular body comprises preferably, but not necessarily, a first and second end. Preferably, the tubular body comprises a main dimension greater than the other two dimensions, so that the first and second ends are therefore preferably the two axially opposed ends in the direction of the larger dimension, such as a longitudinal axis X defined by the tubular body. It is understood in any event that the shape of the tubular body, defined by the shape and number of components present inside and the type of use of the unit, can also be completely rotationally symmetric, so that the choice of the position of the end can be completely arbitrary. Furthermore, two ends can be chosen in one of the minor dimensions of the tubular body.

The tubular body moreover includes an end element. Said end element is suitable for at least partially closing the opening placed at one of the ends of the tubular body. The end element can be fastened to the other part of the tubular body by means of mechanical devices, such as for example threaded screws, or other, since the presence of grooves, seats, and/or recesses in the end element, or part thereof, is acceptable, as described hereinafter.

The end element includes, for example in its central portion, a protruding body. Said protruding body can be suitable for housing for example one or more electrical connectors for electrically connecting the optoelectronic components present inside the tubular body. Furthermore, it can be suitable for housing a connector for the electrical connection to ground. Alternatively, the protruding body is a mechanical sealing element having the function described hereinafter.

According to the invention, the optical unit also includes a cover element, which is suitable for covering the end of the tubular body including the end element. The cover includes parts of the opening in the tubular body if they remained open by part of the end element, and at least a portion of the end element that presents seats, grooves, etc. caused by the mechanical coupling elements between the end element and the rest of the tubular body.

Advantageously, the cover element presents an external surface opposite an internal surface that faces the end body when coupled to the tubular body, which is substantially smooth a devoid of portions that are difficult to clean. The cover element moreover comprises a through hole suitable for letting the protruding body come out of it. When the cover element is coupled to the tubular element, the end element is covered entirely or for the most part by the cover element; however, the protruding body emerges from the through hole. The protruding body possesses for example the shape of a shaft, or in any event a cylindrical shape elongated in one direction. Preferably, said direction coincides with the axial direction defined by the main direction of the tubular body.

In a preferred embodiment the end element includes a concave casing, preferably substantially shaped as a "cup". It defines two perimeter edges: A first perimeter edge, also called the external perimeter edge, which represents the end part of the casing that faces the tubular body when the end element is coupled to it, and a second perimeter edge corresponding to the through hole.

The cover element is preferably coupled to the body by moving in a direction that will be called hereinafter the axial direction. The cover element, which is substantially shaped as a "cup", is placed to cover the end of the tubular body containing the end element and the protruding body. In order to carry out this coupling, the shape of the optical unit is preferably created so that the position of the through hole is aligned with the protruding body.

The end element and/or the protruding body can be coupled in turn to fastening brackets in order to fasten the constructed optical unit in the desired position, such as for example for protecting a determined working zone.

An objective achieved by the optical unit of the invention is preferably not only being easy to clean, which is achieved by covering all the mechanical connections that require seats—such as those in FIG. 17—with the cover element, but also being impervious to liquids, such as for example according to standards IP65, IP67, IP69K or other, in accordance with the use. Hence, in order to guarantee a sealed tubular body, the coupling between the cover element and the end of the tubular body is advantageously hermetic. For this purpose, a sealing system according to the invention is employed.

The sealing system of the invention is a "two stage" system, which includes a first and a second sealing element. By coupling the first and second sealing elements to the tubular body, two forces acting in two different directions are generated, which together enable a hermetic coupling of the cover element on the tubular body itself.

The first sealing element is compressed along a first portion between the end element and the cover element. More precisely, a first portion of the first sealing element is interposed between a first surface of the perimeter edge of said cover element and a first surface of said end element. This "crimping" by compression of the first sealing element creates a reaction force in the first sealing element itself, which is directed in a radial direction, and in particular preferably in a direction substantially perpendicular to the two surfaces carrying out the "crimping". In this manner, a first seal is present, which is caused by the force that keeps the two surfaces of the end element and the cover element together as a result of the radial thrust.

This compression force in a radial direction is in a single direction and prevents the introduction of liquids by closing the slits present between the end element and the cover element. However if the tubular body is subjected to vibration or movements and hence to forces acting in the direction of the compression force in the radial direction, the hermetic coupling by means of the first sealing element is not always capable of preventing the decoupling of the cover element from the tubular body.

When compressed, the second sealing element serves to generate a second force that crosses the first and therefore prevents the cover element from decoupling under normal conditions of use of the optical unit because in all the directions in which an external force can act there is a component of a force caused by the first or the second sealing element that maintains the cover element in close contact with the tubular body.

The second sealing element is interposed in part between said protruding body and a perimeter edge of said through hole in said cover element. The first portion of said second sealing element is substantially "crimped and compressed" between a first surface of a casing of said protruding body and a first surface of said perimeter edge of said through hole in said cover element. As a result of the configuration of these surfaces, an axial force is developed in this case, which crosses the above described radial force.

As a result of this axial force, the first sealing element is also affected, because the cover element that includes the through hole that is subject to the axial force is also terminated against the first sealing element, also crimping the latter one in the axial direction. Therefore, the system of the first and second sealing elements generates a radial and an axial force allowing a solid seal of the cover element on the tubular body and covering all the parts that are difficult to clean, and guaranteeing in any event the desired imperviousness to liquids of the internal part of the tubular body where the optics are housed.

Preferably, said axial direction and said radial direction are substantially perpendicular.

Advantageously, the axial direction corresponds to the direction given by an axis of the tubular body, such as longitudinal axis X. More preferably, it coincides with the principal direction of orientation of the tubular body. Considering a point on the axis of the tubular body as the "center", the radial direction is the direction moving away (radius) from the point on the axis considered as the center. According to this definition, the axial and radial directions are substantially perpendicular to each other.

Preferably, said cover element is suitable for being coupled to said tubular body by means of a coupling force along said axial direction.

The cover element is coupled to said tubular body in the axial direction; that is to say, in order to fasten said cover element to said tubular element a force is preferably applied along the axial direction. In this axial coupling the protruding body is inserted into the through hole.

In a preferred embodiment, said first surface of the perimeter edge of said cover element and said first surface of said end element between which said first portion of the first sealing element is interposed, are substantially perpendicular to said radial direction.

In a given reference system, a surface has two components, which are two planes along two directions perpendicular to each other. If the directions perpendicular to each other are the axial direction and the radial direction, every surface includes a component that represents the projection of the surface in the plane that includes said direction, in one plane and in the other one. Therefore the surfaces that "crimp" the first portion of the first sealing element generating in the process a radial force, are substantially perpendicular to the force they generate, or "substantially perpendicular" to it; that is to say, their component in a plane that contains the direction perpendicular to the radial direction is increased. In fact the compression of the sealing element between two surfaces generates a reaction force perpendicular to the surfaces themselves: The radial force is preferably generated by the compression of two surfaces substantially oriented along the axial direction.

Advantageously, said first surface of the casing of said protruding body and said first surface of said perimeter edge of said through hole between which said first portion of the second sealing element is interposed, are substantially perpendicular to said axial direction.

As described above in connection with the first sealing element, the surfaces that cause the crimping and compression of the first portion of the second sealing element are oriented in a direction substantially perpendicular to the direction of the reaction force that is generated. The axial force is hence preferably generated by surfaces that are oriented substantially along the radial direction.

In a preferred embodiment, a second portion of said first sealing element is interposed between a second surface of the perimeter edge of said cover element and a second surface of said end element, wherein said second portion is subjected to an axial compression force.

As was described, the compression crimping of the first portion of the second sealing element generates an axial force that also acts on the first sealing element, because it acts on the cover element that is in contact with the first sealing element. In order to prevent the first sealing element from moving from the position it is placed in as a result of this axial force, a second portion of the first sealing element is "crimped" between two additional surfaces that prevent movement in the axial direction, because as a result of this compression they also generate an axial reaction force. The function of these surfaces, one located in the end element and one in the perimeter edge of the cover element, is to provide a terminal surface for the first sealing element, which is subjected to the axial force caused by the compression of the second sealing element. Moreover, the axial and radial compression guarantees the lack of fissures between the first sealing element and the surfaces it is attached to.

Advantageously, a second portion of said second sealing element is interposed between a second surface of a casing of said protruding body and a second surface of said perimeter edge of said through hole in said cover element, wherein said second portion is subjected to a compression force along a radial direction.

Also in this case, a second portion of the second sealing element is crimped between two additional surfaces so that it is also solidly blocked in case of vibration or movement of the optical unit. Moreover, this radial compression guarantees the hermetic closure of the through hole by the second sealing element.

In an embodiment, said end element includes a first seat created on its external surface suitable for at least partially receiving said first sealing element, wherein said first seat includes said first and/or said second surface of said tubular body.

More preferably, said seat comprises a circular groove, while said first surface is a bottom surface of said groove and said second surface is a side surface that delimits said seat and is perpendicular to said bottom surface.

The first seat is created in the external surface of the end element so that it can receive the first sealing element set down inside of it. The seat, which is preferably shaped as a groove, is delimited by three walls: a bottom wall which is substantially a bottom ring surface that together with the first surface of the perimeter edge of the cover element radially compresses the first sealing element, and two side walls rising from the bottom wall. The two side walls, which are preferably parallel to each other and more preferably also parallel to the radial direction, delimit the dimension of the seat in the axial direction and in turn limit the potential axial movement of the first sealing element. Of the two, the wall that is not in contact with the cover element is the wall against which the second portion of the second sealing element leans in the axial direction when thrust by the axial force generated when the second sealing element is crimped.

Preferably, said groove is a ring groove that surrounds said end element circularly and is created in the side surface of the same.

Preferably, said cover element includes a first plurality of ribs or ribbing in said first surface of the perimeter edge of said cover element. The plurality of ribs or ribbing allows the expansion of the sealing element into the "empty spaces" between one rib and the next when the sealing element is compressed.

In a preferred embodiment, said protruding body includes a second seat surface suitable for at least partially receiving said second sealing element, wherein said second seat includes said first and/or said second surface of said casing of said protruding body.

More preferably, said second seat includes a circular groove on said casing, while said second surface is a bottom surface of said groove and said first surface is a side surface that delimits said seat and is perpendicular to said bottom surface.

The protruding body comprises a second seat shaped similarly to the first seat created in the tubular body, that is to say a bottom ring surface and two walls facing each other, which are substantially parallel to the radial direction and delimit the second seat axially. The second sealing element is at least partially received in this second seat so that it cannot move axially, as a result of axial forces being applied because its movement is blocked by the two walls of the seat facing each other and perpendicular to the bottom wall. The first portion of the second sealing element protrudes from the second seat so that it leans against the cover element in correspondence with the perimeter edge of the through hole and hence generates the axial compression force.

Advantageously, said cover element includes a second plurality of ribs or ribbing in said second surface of said perimeter edge of said through hole. The plurality of ribs or ribbing allows the expansion of the second sealing element into the "empty spaces" between one rib and the next when the sealing element is compressed.

In an embodiment, the first sealing element and/or the second sealing element are substantially shaped as an L, each including a first and a second arm intersecting each other at an angle, wherein said first and said second arms include said first and said second portion, respectively, of said first and/or said second sealing elements.

The shape as an L preferably implies the presence of two portions arranged along intersection directions, and more preferably substantially perpendicular to each other. For each sealing element, said two portions represent the first and the second portion that are "crimped" in different directions in each sealing element and hence generate reaction forces that intersect each other. Preferably, said two intersecting directions are the axial and the radial directions.

Advantageously, said tubular body includes said first and a second end, said first end element, and a second end element, wherein said first and second end elements are coupled to said tubular body in order to form said first and second ends and each of said first and second end elements are suitable for being covered by said first cover element and a second cover element, wherein said second cover element is coupled to said tubular body by means of said sealing system.

Preferably the tubular body is oriented in a main direction, which corresponds to said axial direction. The tubular body is closed at its ends by means of two end elements which are in turn covered by two cover elements. Both in relation to the first and second cover elements, the coupling between them and the tubular body is carried out according to the sealing system of the invention.

Advantageously, said first end element is coupled to said tubular body by means of the interposition of a third sealing element. More preferably, said first end element is coupled to said tubular body by tightening screws that engage said tubular body and said third sealing element.

The hermetic coupling between the end element and the tubular body both by means of seal and screws guarantees that the hermetic mechanical closure of the tubular body is guaranteed by the screws, while the two sealing elements guarantee the seal of the additional cover element.

Preferably, said first and/or second sealing elements comprise a gasket fitted on said end element and/or on said protruding body, respectively.

In a preferred embodiment, said tubular body is manufactured in metal.

Metal guarantees resistance, which is understood In particular as resistance against the action of chemical agents, as required in the pharmaceutical and/or food processing sectors.

In a sixth aspect of the invention, the invention further relates to a method for implementing the hermetic cover of a tubular body suitable for housing one or more optoelectronic components of an optical unit in an optoelectronic system. The tubular body comprises:

A first end that can be opened in order to insert one or more of said components, and a first end element including a protruding body in correspondence with said first end;

A cover element for said end comprising a through hole suitable for letting said protruding body out through said cover element when said cover element is coupled to said tubular body in order to cover said end; and A sealing system for the hermetic cover of said end by means of said cover element including a first and a second sealing element;

Wherein the method includes:

Fitting the first sealing element on the end element;

Fastening the first sealing element on the end element;

Coupling the cover element to the first end element by translating the cover element in an axial direction until leaning against the end element and/or the first sealing element;

During the coupling step of the cover element on the first end element, introducing the protruding body inside the through hole and compressing a first portion of the first sealing element between the cover element and the first end element generating a force in the radial direction;

Fitting said second sealing element on said protruding body;

Leaning said second sealing element against an external surface of a perimeter edge of the through hole of the cover element; and Compressing a first portion of the second sealing element between a surface of the protruding body and the surface of the perimeter edge of the through hole in order to generate a force in the axial direction.

The sealing system includes a first and a second sealing element.

According to the method of the invention, the first sealing element is fitted on the end element and the fastened thereto. The fastening may be carried out for example by means of screws, glue, or thanks to the presence of a seat where it is placed. Hence the cover element is made to slide in an axial direction until leaning against the end element and the first sealing element, so that the protruding body is introduced inside the through hole and compresses a first portion of the first sealing element between it and the end element, generating a radial force.

A second step of the method of the invention is hence to fit said second sealing element on said protruding body until said second sealing element leans against the external surface of the protruding body and is axially compressed between a surface of the protruding body and a surface of a perimeter edge of the through hole in order to generate an axial force.

The combination of radial and axial forces guarantees the hermetic closure of the cover element of the tubular body.

According to a seventh aspect, the invention relates to a tubular body suitable for housing one or more optical components, comprising:

A first end that can be opened in order to insert one or more of said optical components, and a first end element including a protruding body in correspondence with said first end;

A cover element for said end comprising a through hole suitable for letting the protruding body out through said cover element when said cover element is coupled to said tubular body in order to cover said end;

A sealing system for the hermetic cover of said end by means of said cover element;

Wherein said sealing system comprises:

A first sealing element interposed by crimping and compression between a perimeter edge of said cover element and said end element, so that a first portion of said first said sealing element is interposed between a first surface of the perimeter edge of said cover element and a first surface of said end element, generating a compression force along a radial direction;

A second sealing element interposed by crimping and compression between said protruding body and a perimeter edge of said through hole in said cover element, so that a first portion of said second sealing element is interposed between a first surface of a casing of said protruding body and a first surface of said perimeter edge of said through hole in said cover element, generating a compression force along an axial direction; and wherein said axial direction and said radial direction cross each other.

In fact the sealing system comprising the first and second sealing element can be utilized in any type of tubular body that requires having a smooth external surface. Preferably this tubular body is employed in environments where type IP65 or greater imperviousness to liquids is required.

Preferably, the tubular body is designated for housing optical components such as for example emitters and/or receivers of light radiation.

Preferably, the tubular body according to the seventh aspect of the invention envisages as preferred aspects all the preferred aspects, whether in combination or in alternative, described in relation to the sixth aspect of the invention.

BRIEF DESCRIPTION OF THE SEVERAL VIEWS OF THE DRAWING

These and additional advantages of the invention will become more evident from a detailed description in reference to the enclosed drawings, where:

FIG. 3 is a perspective view of a first example of a semi-finished component of the module of the invention and a first example of a step of the method of the invention;

FIGS. 4 and 4*a* represent two perspective views, where FIG. 4*a* is an enlarged scale detail view of FIG. 4, of a first example of a semi-finished component of the module of the invention and a first example of an additional step of the method of the invention;

FIGS. 5 and 5*a* represent two perspective views, where FIG. 5*a* is an enlarged scale detail view of FIG. 5, of a first example of a semi-finished component of the module of the invention and a first example of an additional step of the method of the invention;

FIGS. 6 and 6*a* represent two perspective views, where FIG. 6*a* is an enlarged scale detail view of FIG. 6, of a first example of a semi-finished component of the module of the invention and a first example of an additional step of the method of the invention;

FIG. 7 is a perspective view of a first example of a semi-finished component of the module of the invention and a first example of an additional step of the method of the invention;

FIG. 8 is a perspective view of a first example of a semi-finished component of the module of the invention and a first example of an additional step of the method of the invention;

FIG. 9 is a perspective view of a first example of a semi-finished component of the module of the invention and a first example of an additional step of the method of the invention;

FIG. 10 is a perspective and cross-section view of a first example of a semi-finished component of the module of the invention;

FIGS. 11 and 11*a* represent two perspective views, where FIG. 11*a* is an enlarged scale detail view of FIG. 11, of a first example of the module of the invention in exploded operating condition view and a first example of an additional step of the method of the invention;

FIG. 12 is a perspective view of a second example of a semi-finished component of the module of the invention and a second example of a step of the method of the invention;

FIG. 12*a* represents a cross-section view of the component in FIG. 12;

FIGS. 13 and 13*a* are two frontal views, where FIG. 13*a* is an enlarged scale detail view of FIG. 13, of a second example of a semi-finished component of the module of the invention and a second example of an additional step of the method of the invention;

FIG. 14 represents a frontal view of a second example of a semi-finished component of the module of the invention and a second example of an additional step of the method of the invention;

FIG. 15 represents a perspective view of the semi-finished component in FIG. 14;

FIG. 16 is a perspective view of an additional example of an optical unit belonging in a light barrier implemented according to the invention;

FIG. 17 is a perspective view of an end of an optical unit according to the prior art;

FIGS. 18 to 22 are perspective figures of a detail of a third preferred example of the optical unit according to the invention in different stages of assembly;

FIG. 23 is a perspective cross-section view of the details in FIG. 21;

FIGS. 24, 24a, and 24b are perspective cross-section figures, where FIGS. 24a and 24b are enlarged scale representations of two details of FIG. 24, the detail of FIG. 22; and FIGS. 25 and 26 are perspective figures of a detail of a fourth preferred example of the optical unit according to the invention in two different stages of assembly.

DETAILED DESCRIPTION OF THE INVENTION

Figure 2C:
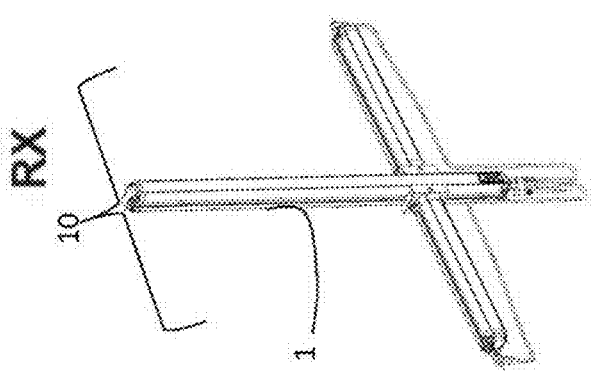
FIGS. 2*a*, 2*b*, and 2*c* are three perspective views of three different arrangements of light barriers that can be obtained with the module of the invention and/or the method of the invention.
Figure 2B:
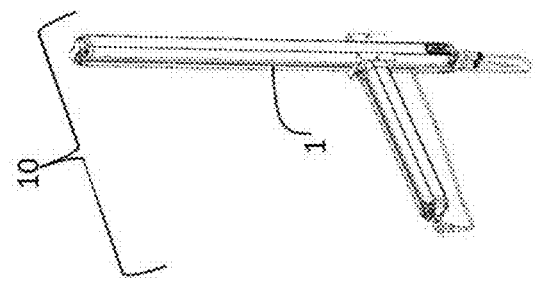
Figure 2A:
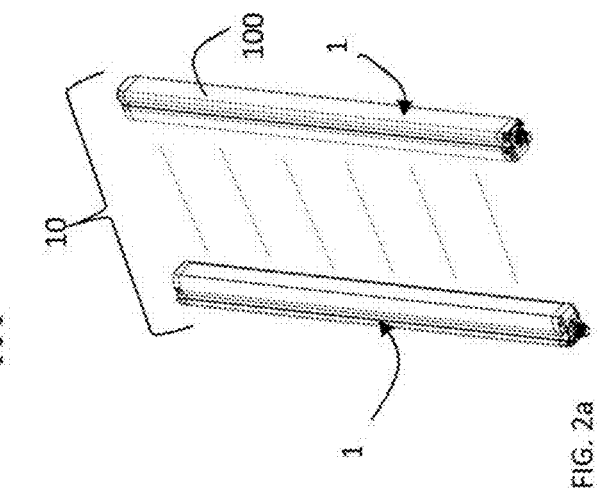

Starting with FIGS. 2a-2c, in the present invention a light barrier implemented according to the present invention is globally indicated with number 10.

Light barrier 10 implemented according to the invention can be utilized in any operating environment in which the use of light barriers is well known and more preferably in the technical sector of pharmaceutics and food processing where high resistance to "aggressive" chemical agents is required.

Figure 1:
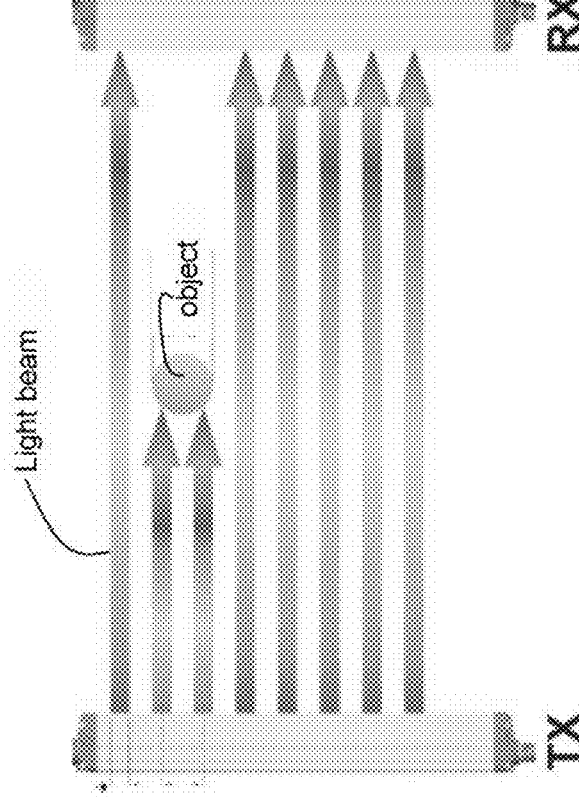
FIG. 1 is a schematic frontal view of the principle of operation of an embodiment of the light barrier.

The range of shapes of light barrier 10 that can be obtained according to the invention can be very wide, starting from light barrier 10 including a first and a second optical unit, both indicated with number 1, where one unit is in front of the other (see FIG. 2a), wherein first optical unit 1 includes a plurality of emitters and the second a plurality of receivers 1 (similarly to the example in FIG. 1), such as cross-beam optical barriers 10 where one or more photocells detect the transition of objects (FIGS. 2b and 2c) while at the same time monitor the involuntary insertion of foreign bodies, such as for example the arm of an operator, distinguishing it from the transitioning objects (the so-called "muting" function).

Light barrier 10 includes at least one optical unit 1. Optical unit 1 can be an emitter unit, a receiver unit, or an emitter and receiver unit.

Optical unit 1 in turn comprises a module 100. Optical unit 1 can include a single module 100, and hence be comprised by the module itself, or a plurality of modules 100, such as for example for a barrier of large dimensions or for units with particular overall shapes including curves or corners.

Figure 11:
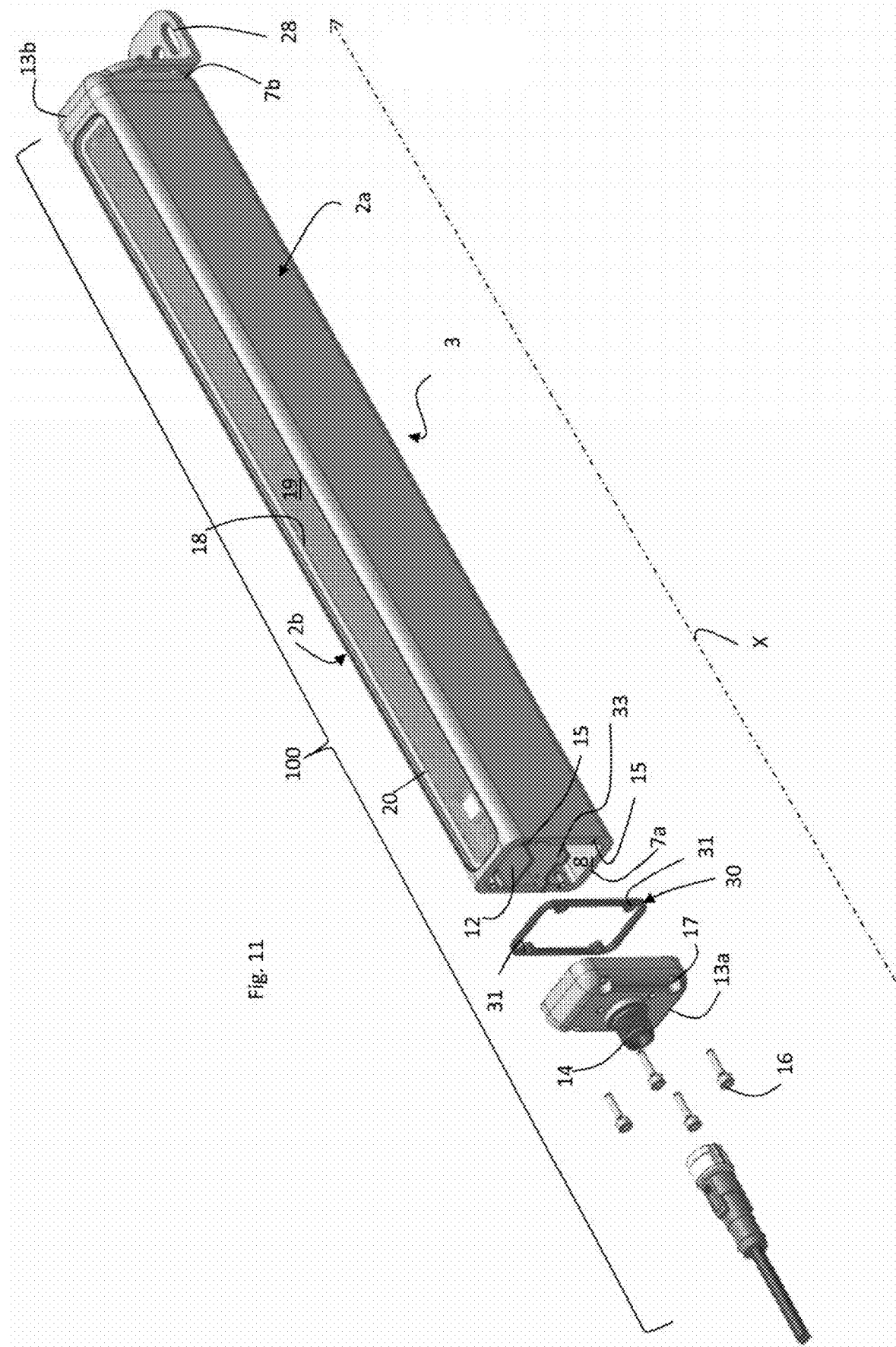

Module 100 of the invention is represented entirely in FIGS. 11 and 11a; the latter figure represents an enlarged scale detail of FIG. 11.

Module 100 includes a tubular body 3. In a first preferred embodiment of the invention, the tubular body is provided with a casing 5 comprising a first and a second element 2a, 2b, manufactured in stainless steel, and more preferably type 3xx steel, and more preferably still 316L in accordance with the AISI classification. First and second elements 2a, 2b are oriented in a main direction, which represents the axis of tubular body X, while preferably each one substantially comprises half of the casing of tubular body 3. The thickness of the casing of tubular body 3 is for example between 1 mm and 8 mm, and preferably around 4 mm. Greater thicknesses make bending difficult.

First and second elements 2a, 2b are preferably shaped as a C or U in a cross-section along a plane perpendicular to the main dimension. Each element 2a, 2b therefore presents a central wall 4a, 4b that corresponds with the central portion of the U or C cross-section, from which two side walls 5a, 5b; 5c, 5d extend in a substantially symmetric manner at an angle with respect to central wall 4a, 4b, which represent the arms of the U or C cross-section. Each side wall 5a, 5b; 5c, 5d ends with an edge 6a, 6b; 6c, 6d that extends along a main direction of each element. Said edges are preferably straight. All central and side walls are preferably substantially flat. Preferably, the angle between side walls 5a, 5b; 5c, 5d and central wall 4a, 4b; 4c, 4d is about 90°.

This arrangement is particularly visible in FIGS. 5 and 6a (in FIG. 5 a single element is displayed, either first 2a or second 2b).

Edges 6a, 6b of side walls 5a, 5b of first element 2a are secured by welding to edges 6c, 6d of side walls 5c, 5d of second element 2b, so that tubular body 3 is made into "a single piece".

Tubular body 3 presents two open opposite distal ends 7a, 7b. It moreover defines an internal surface 8 comprising an internal surface 8a of first element 2a and an internal surface 8b of second element 2b. Said internal surfaces 8a and 8b preferably have equal dimension and face each other.

Module 100 moreover includes an emitter and/or a receiver, and more preferably a plurality of light emitters and/or receivers. The emitters are for example LEDs, while the receivers are for example photo-diodes. Emitter and/or receiver, which are not illustrated in the enclosed figures but are well known in the reference sector, are housed in tubular body 3.

A first and a second groove 9a, 9b are created in internal surfaces 8a, 8b, in which to insert a support for the emitter and/or receiver and/or for other circuitry present in optical module 1. Said support includes, as illustrated in FIGS. 11 and 11a, a PCB 12 on which all the elements comprising the emitter and/or receiver optics are preferably mounted.

Grooves 9a, 9b are preferably coplanar and are created even more preferably so that when emitter and/or receiver support 12 is inserted, it is substantially parallel to the arms of the U or C of first and/or second elements 2a, 2b (that is to say, it is parallel to side walls 5a, 5b; 5c, 5d). Preferably, the lengths of grooves 9a, 9b are equal to the length L of the tubular body.

Furthermore, module 100 includes a first and a second end element 13a, 13b attached to opposite ends 7a, 7b of tubular body 3 in order to close said tubular body. Said end elements 13a, 13b are displayed only in FIGS. 11 and 11a. End elements 13a, 13b are preferably different since they perform different functions.

Preferably first and second end elements 13a, 13b are manufactured in stainless steel, and more preferably in type 3xx steel, and even more preferably 316L steel according to the AISI classification. Moreover, first and second end elements 13a, 13b are advantageously coupled to tubular body 3 by interposing a seal gasket 30 in order to enable the overall seal of the tubular body itself and protect the internal optics. Therefore module 100 preferably comprises a first and a second seal gasket 30.

In correspondence with distal ends 7a and 7b, module 100 preferably comprises a plurality of threaded holes in tubular body 3, which are all indicated with number 15, and can be created in order to receive screws 16 for fastening end element/s 13a, 13b.

Threaded holes 15 are preferably created in correspondence with free edges 24a, 24b; 24c, 24d of central wall 4a, 4b of first and second elements 2a, 2b, and run inside the central wall itself in a direction substantially parallel to internal surface 8a, 8b (see FIG. 9). Edges 24a, 24b; 24c, 24d corresponding to ends 7a, 7b of tubular body 3 are preferably substantially perpendicular to edges 6a, 6b; 6c, 6d.

Alternatively, in an embodiment not illustrated, threaded holes 15 can be created in correspondence or in addition on edges of side walls 5*a*, 5*b*; 5*c*, 5*d* in correspondence with ends 7*a*, 7*b*.

In more detail, preferably each end element 13*a*, 13*b* presents through holes or threaded holes 17 created to correspond to threaded holes 15 once module 100 is assembled, so that screws 16 can tighten each end element 13*a*, 13*b* to its corresponding distal end 7*a*, 7*b* of tubular body 3 by "crimping" gasket 30 between end elements 13*a*, 13*b* and tubular body 3. Preferably gaskets 30 also include through holes 31 equal in number and position to through holes 17, so that they can be "crimped" effectively between end elements 13*a*, 13*b* and tubular body 3 by tightening screws 16.

One or both end elements 13*a*, 13*b* are associated with support brackets in order to secure module 100 in the desired position or to another module 100. In the illustrated example, a support bracket 28 is connected to end element 13*b* (see FIG. 11).

One or both end elements 13*a*, 13*b* moreover comprise electrical connectors 14 for electrically connecting the emitter and/or receiver of module 100 and/or for its power supply. Moreover additional connectors are preferably present for connecting to a monitoring and control unit (not illustrated) of light barrier 1.

Furthermore, module 100 includes an opening 18 functioning as a window for the emitter and/or receiver in order to allow the light radiation emitted or received to exit and/or enter tubular body 3. Said window 18 is created in correspondence with the position of the emitter and/or receiver inside tubular body 3.

Window 18 is closed by means of a plate 19 transparent to the light radiation of interest. For example said plate 19 is manufactured in glass or plastic.

Tubular body 3 moreover comprises a flange 20 in correspondence with window 18, which surrounds the entire perimeter of opening 18. Flange 20 functions as a frame for plate 19, which is placed on the flange and fastened thereto. For this purpose flange 20 preferably presents on one of its surfaces facing transparent plate 19, a seat 21 suitable for receiving the glue for gluing transparent plate 19. Seat 21 is preferably also created around window 18 for the entire perimeter of flange 20, forming a channel for the glue.

Furthermore, preferably one of elements 2*a* and 2*b* comprising tubular body 3 includes one or more pins 22, while the other of the elements 2*a* and 2*b* comprising tubular body 3 includes one or more seats 23 for coupling the first one with the second by interference fit. Seats and pins 22, 23 are displayed in FIGS. 5, 5*a*, 6, 6*a*.

Preferably, seats and/or pins 22, 23 are created in correspondence with edge 6*a*, 6*b*; 6*c*, 6*d* of first and/or second elements 2*a*, 2*b*, and are positioned so that when first element 2*a* is coupled to second element 2*b* creating tubular body 3, pins 22 are inserted into seats 23. More preferably, each element 2*a*, 2*b* comprises both seats and pins spaced at a pitch along its edges 6*a*, 6*b*; 6*c*, 6*d*.

Furthermore, module 100 preferably includes an additional PCB 33 also housed inside tubular body 3 in relation to the placement and control of for example a display (not illustrated) and/or LED (also not illustrated) that can be seen by the user through window 18. Said display and/or LED can for example display the status of optical unit 1 or warnings of malfunction.

Module 100 described above is preferably created according to the method of the invention in a first preferred embodiment, as described in reference to FIGS. 3 to 10.

Tubular body 3 is created starting from a stainless steel plate or sheet of the preferred type. In an embodiment the plate or sheet is manufactured in 4 mm thick AISI 316L steel. The plate is either cut in two to form two sub-plates (also referred as plates for brevity's sake), or the two plates are already available.

The plates are hence bent into the C or U shape cross-section as described above. Said C or U shapes are created without any machine operation but by bending the plate in the desired manner. After being bent in this manner both plates have preferably the same shape and dimensions. Therefore, by bending the previously substantially flat plates they form a first and a second semi-finished product 2*a*", 2*b*", one of which is illustrated in FIG. 3 (preferably the two semi-finished products are substantially identical). Each semi-finished product 2*a*", 2*b*" presents a central wall 4*a*, 4*b* that corresponds with the central portion of the U or C cross-section, from which two side walls 5*a*, 5*b*; 5*c*, 5*d* extend in a substantially symmetric manner at an angle with respect to central wall 4*a*, 4*b*, which represent the arms of the U or C cross-section. Each sidewall 5*a*, 5*b*; 5*c*, 5*d* ends with a free edge 6*a*, 6*b*; 6*c*, 6*d*. Preferably edges 6*a*, 6*b*; 6*c*, 6*d* extend substantially in a direction parallel to axis X of tubular body 3 when assembled.

Alternatively, bent semi-finished product 2*a*", 2*b*" can be purchased already bent; in this case the bend has already been carried out and bent semi-finished products 2*a*", 2*b*" are the starting material for the method of the invention.

Semi-finished products 2*a*", 2*b*" are hence processed by machine, and preferably milled, in order to create a groove 9*a*, 9*b* on one of its surfaces. Surfaces 8*a*, 8*b* on which grooves 9*a*, 9*b* are created are the surfaces of the semi-finished product that is part of the internal surface 8 of tubular body 3 when assembled. Each semi-finished product 2*a*", 2*b*" including grooves 9*a*, 9*b* created by machine becomes a processed semi-finished product 2*a*', 2*b*' illustrated in FIGS. 4 and 4*a*.

Furthermore, additional grooves can be created in internal surfaces 8*a*, 8*b* of semi-finished products 2*a*", 2*b*" if necessary. In the cross-section in FIG. 10, additional grooves are displayed; for example, grooves 25*a* and 25*b* are displayed in FIGS. 10 and 11*a*.

A plurality of pins 22 and/or seats 23 is then created in processed semi-finished products 2*a*', 2*b*' for coupling by interference fit of first and second processed semi-finished products 2*a*', 2*b*'. Pins and seats are created in correspondence with free edge 6*a*, 6*b*; 6*c*, 6*d* of first and second processed semi-finished products 2*a*', 2*b*' in such a position that every pin is received in a respective seat when first and second processed semi-finished products 2*a*', 2*b*' are coupled to each other. Furthermore, each free edge 6*a*, 6*b*; 6*c*, 6*d* preferably includes both seats 23 and pins 22. The creation of seats and pins can be carried out for example as follows. A plurality of seats 23 are created in free edges 6*a*, 6*b*; 6*c*, 6*d* of first and second processed semi-finished products 2*a*', 2*b*', for example by machining. Some of said seats are left unoccupied, while pins 22, which then protrude from the edge itself, are inserted by interference fit into others.

Processed semi-finished products 2*a*', 2*b*' in which seats 23 and pins 22 have been created, are the first and second elements 2*a*, 2*b* illustrated in FIGS. 5 and 5*a*.

First and second elements 2*a*, 2*b* are then coupled to each other to create tubular body 3 as illustrated in FIGS. 6 and 6*a*. Coupling is carried out by means of interference fit inserting pins 22 into seats 23 while edges 6*a* and 6*b* of first element 2*a* are brought in contact with edges 6*c* and 6*d* of second element 2b. The presence of pins 22 and seats 23 ensures the correct alignment and fitting of the two elements 2a, 2b.

Two elements 2a, 2b coupled in this manner are then welded together, so that tubular body 3 is created in a manner substantially analogous to a single piece tubular body; that is to say, the weld is carried out along the entire line of contact of edge 6a with edge 6c, and edge 6b with edge 6d. The result of this operation is illustrated in FIG. 7.

Tubular body 3 created in this manner is then machined, for example by milling, to create an opening 18. Said opening is created substantially symmetrically with respect to first and second elements 2a, 2b; that is to say, a "half window" is created in first element 2a while the other "half window" is created in correspondence with second element 2b. The window, which is just a through opening, is created in correspondence with side walls 5a, 5c or 5c, 5d of first and second elements 2a, 2b.

The creation of window 18 also envisages the creation of flange 20, which surrounds the perimeter of window 18. Flange 20 moreover comprises seat 21, which is also created by means of machining. Tubular body 3 processed in this manner is illustrated in FIG. 8.

Optionally holes 15 are then created, for example threaded holes, in correspondence with a distal end 7a, 7b of the tubular body, and in particular more preferably on free edges 24a, 24b; 24c, 24d of central wall 4a, 4b of each element 2a, 2b. Edges 24a, 24b; 24c, 24d corresponding to distal end 7a, 7b are substantially perpendicular to edges 6a, 6b; 6c, 6d. More preferably, threaded holes 15 are created in correspondence with both distal ends 7a, 7b of the tubular body.

Glue is then deposited on seat 21 of flange 20, for example, UV hardening glue, by means of which plate 19 is fastened to close window 18 itself. The dimensions of plate 19 are conveniently selected to correspond to the dimensions of the seat defined by window 18 and flange 20.

A support, such as for example PCB 12, on which the emitter and/or the receiver of the light barrier are mounted is then inserted in tubular body 3, guided in the process by sliding inside grooves 9a and 9b, for example. In this manner PCB 12 is substantially parallel to window 19. Additional PCBs can be inserted into the tubular body, such as for example PCB 33 described above. In this manner grooves 9a, 9b, 25a, 25b previously created in internal surfaces 8a and 8b are used as guides, obtaining a simple and convenient alignment of the electronics inside tubular body 3.

Grooves 9a, 9b, 25a, 25b can be occupied not only by supports, such as PCBs, but can also function as guides for parts or elements mounted on the supports themselves. For example grooves 25a, 25b serve as guides and/or supports for portions of the optics (not shown in the figures) mounted in PCB 12.

Tubular body 3 containing emitter and/or receiver is then closed with first and second end elements 13a, 13b. For this purpose, gasket 30 is interposed between each end element 13a, 13b and respective distal end 7a, 7b of tubular body 3.

End elements 13a, 13b, which are preferably also manufactured in stainless steel, include one or more through holes 17 in a position corresponding to threaded holes 15 created in tubular body 3. Therefore screws 16 are utilized to tighten end elements 13a, 13b, on tubular body 3 by means of through holes 31 created in gaskets 30, while also securing gaskets 30 in the process.

In this manner module 100 is then conveniently connected electrically to a control unit and a power supply unit (neither unit is depicted), for example by means of connectors 14 created on end elements 13a, 13b. Module 100 can be connected to other modules 100 in order to form an optical unit 1, or can independently comprise an optical unit 1. Furthermore, module 100 is associated with additional optical units 1 in order to implement light barrier 10.

The status of optical unit 1 can be displayed by means of the display or LED mounted in PCB 12 and visible through transparent plate 19 covering window 18.

With reference to FIGS. 12 to 15, in a second preferred embodiment, tubular body 3 can be manufactured as a single piece, always preferably in stainless steel, and more preferably type 3xx steel, and even more preferably 316L steel according to the AISI classification. The semi-finished product can be a tubular body such as in FIG. 12, or a solid bar (such as a non-hollow semi-finished product shown in FIG. 12). However, the method by which the semi-finished product shown in FIGS. 12 and 12a is obtained is not relevant in the present invention; it could therefore be obtained from a single piece or more pieces welded or otherwise joined together.

Characteristics that are not described subsequently in connection with the second preferred embodiment of tubular body 3 are to be considered to be substantially equal to those described in reference to the first preferred embodiment above. In particular, support 12, window 18, and end elements 13a, 13b will not be described, since they are considered to be substantially equal to those of the previous embodiment.

Semi-finished tubular body 3 in FIGS. 12 and 12a is provided with a length L along the longitudinal axis X of the body, as well as a thickness T. Length L is arbitrary; it depends on the type of use of module 100 and can have a wide range of variation. The thickness T is defined as the thickness of casing 5 of semi-finished tubular body 3 in a cross-section in a perpendicular plane with respect to axis X. The thickness T is generally constant in the industrial semi-finished tubular bodies available on the market, however the present invention also covers semi-finished products with a variable thickness. Moreover, solid bars of length L are also covered.

The thickness T of a tubular element considered as the starting semi-finished product for the present invention is preferably between 4 mm and 8 mm, and is preferably about 5 mm.

According to the invention, semi-finished tubular body 3 is processed in the manner described hereinafter in order to obtain a finished tubular body such as illustrated in FIGS. 14 and 15. Finished tubular body 3 in the invention includes as least a zone of "reduced" thickness 27 with thickness T1, wherein the thickness was reduced with respect to the original thickness T. The areas with a reduced thickness are identified in FIG. 14 as the zones included between the two arrow heads and indicated with reference number 27. Portion with reduced thickness 27 can be implemented with a reduced thickness for the entire length L, or only for a segment thereof. Therefore, tubular body 3 presents segments with cross-section D1×T1 and length equal to L or a segment of L. Tubular body 3 shown in FIG. 14 includes two portions with reduced thickness 27 provided with the same dimensions and symmetric with respect to a plane crossing axis X of the tubular body, however an arbitrary number of portions with reduced thickness 27 is possible. Moreover, the thicknesses of the portions with reduced thickness can be different in each portion.

In addition to portions with reduced thickness 27, the tubular body presents at least one portion with greater thickness; in FIG. 14 two additional portions with greater thickness 29 are shown. The thickness T2 of these portions 29 can be the same as the starting thickness T of semi-finished tubular body 3 or potentially even less, as long as T1<T2. Portion with greater thickness 29 can be implemented with an increased thickness for the entire length L, or only for a segment thereof. Therefore the tubular body presents segments with cross-section D2×T2 and length equal to L or equal to a segment of L. The tubular body shown in FIG. 14 includes two portions with increased thickness 29 provided with the same dimensions and symmetric with respect to a plane crossing axis X of the tubular body, however an arbitrary number of portions with increased thickness 29 is possible. Moreover, the thicknesses of the portions with increased thickness can be different in each portion.

An arbitrary number of additional portions with different thicknesses in addition to T1 and T2 in tubular body 3 can be present.

Additional machining is possible in zones with reduced thickness 27; for example grooves 9a, 9b can be created in these zones, wherein grooves 9a, 9b preferably face each other as in the previous embodiment in FIG. 11. Other grooves, such as grooves 25a and 25b can similarly be created.

As can be seen in FIG. 13 and in the enlarged scale view in FIG. 13a, each groove, whether grooves 9a, 9b or 25a, 25b, preferably includes at least two surfaces that intersect each other, and more preferably three surfaces that intersect each other denominated p1, p2, and p3. Surface p2 can be considered to be the bottom surface of the groove while surfaces p1 and p3, which extend from the two axial ends of p2, the side walls of the groove. The angle between these walls is arbitrary and is always about 90°+/−1°. Preferably, surfaces p1, p2, and/or p3 are created so that two contiguous intersecting walls are joined by means of a portion of cylindrical surface c1, c2. The nominal diameter of the wire employed, which sets the diameter of the cylindrical surface c1, c2, is preferably between 0.02 mm and 0.33 mm.

Furthermore, also the zones 29 featuring a greater thickness can be subjected to additional processing, and in particular machining that can weaken the strength of casing 5. For example, holes 15 can be created in the zones 29 featuring a greater thickness, preferably starting from an end 7a or 7b of the tubular body. Holes 15 for receiving screws 16 are preferably oriented in a direction parallel to axis X.

Finished tubular body 3 such as in FIGS. 14 and 15 then receives a support for the radiation emitter or receiver and presents a window 18, as already described in relation to the previous embodiments of tubular body 3. Moreover, the ends of tubular body 3 are preferably closed by end elements 13a, 13b.

Preferably, the tubular body in FIGS. 14 and 15 is obtained, according to the following method of the invention.

Starting from tubular body 3 in FIGS. 12 and 12a, or from a solid bar not illustrated, provided with constant thickness T and length L, the body is machined in its internal surface 8 by means of wire-cut electrical discharge machining. A wire (not illustrated in the figures) serving the function of an electrode removes material from inside the tubular body in the desired zones, such as for example in portions 27, in order to reduce its thickness and moreover to form grooves 9a, 9b, 25a, 25b until reaching the desired shape and thickness. The finished tubular body appears as in FIGS. 13 to 15. Thanks to electrical discharge machining the thickness of the tubular body can be varied as desired according to need, since substantially any shape is possible.

As a result of the finite dimensions of the wire utilized as the electrode, actual changes in the orientation of internal surface 8 of tubular body 3 present substantially cylindrical c1, c2 transition zones.

Portions with reduced thickness 27 and grooves 9a, 9b possess a length equal to the length L of tubular body 3.

Perforation in order to create holes 15 is then preferably carried out in order to mount end elements 13a, 13b on casing 5.

Support 12 holding an emitter and/or receiver of electromagnetic radiation in said casing is inserted in the grooves created in the tubular body.

As previously stated, above described tubular body 3 in any of its variants, whether a single piece or created from two welded elements, or whether created by means of bending or electrical discharge machining, preferably comprises an end body to close said tubular body. The following describes a second preferred embodiment of end body 13a', 13b' and a method for closing the tubular body by means of the end element according to a preferred embodiment of the invention, in order to obtain a closed tubular body, called shell 2, as illustrated in FIG. 16.

Shell 2 is illustrated in a first preferred embodiment in FIGS. 18 to 22, wherein of the two ends only end 7a is illustrated. Opposite end 2b not shown can have an equal shape to end 7a, or a different one.

Shell 2 includes a first and a second end element, wherein only first element 13a' is illustrated in the figures, while tubular body 3 (only partially illustrated in the figures) in turn defines a first and a second end, wherein only first end 7a is illustrated, which are devised to be closed by end elements 13a', 13b'. In order to insert the optoelectronic components, the shell presents an opening 4, which is conveniently closed to guarantee the standards of resistance and imperviousness. Preferably, opening 4 is created in correspondence with one of the two ends of the shell, and in the preferred embodiment 7a. Additional openings can be present in shell 2, such as for example a window 18 closed by means of a material transparent to a certain electromagnetic radiation in order to transmit or receive said electromagnetic radiation.

As previously described above, tubular body 3 defines a casing 5 that extends along the longitudinal direction or X axis, also called the axial direction.

Furthermore a radial direction (indicated as R axis in the figures) is defined from axial direction X. All points on the X axis can be considered as a center from which a "ray" is projected in the R direction. For all points on the X axis there exists a plane of radial directions, which includes all the straight lines perpendicular to the X axis moving away from the point chosen as the center. The radial distance of a point is the distance of that point from the "center" in the X axis from which the "ray" moves away in the R direction.

Preferably first 13a' and the second end elements are manufactured in metal. As in the first preferred embodiment of end body 13a, 13b, this preferred embodiment can also be manufactured in steel.

Now, with reference to FIGS. 18 to 22, only first end 2a of shell 2, first end 7a of tubular element 3, and first end element 13a' are described. End element 13a is advantageously coupled to tubular body 3 by interposing a seal gasket 30 in order to guarantee the overall seal of shell 2 and to protect the internal optics.

In order to fasten end element 13a' to tubular body 3 in correspondence with end 7a, tubular body 3 preferably comprises a plurality of threaded holes, all indicated with number 15, created in casing 5 to receive screws 16 to fasten end element 13a' and gasket 30. Advantageously, the threaded holes are created substantially parallel to axial direction X. Preferably, threaded holes are created in the thickest part of tubular body 3, as described in the embodiment related to FIGS. 12 to 15.

In more detail, preferably end element 13a' presents through holes or threaded holes 17 created to correspond to threaded holes 15 once unit 1 is assembled, so that screws 16 can tighten end element 13a' to its corresponding distal end 7a of tubular body 3 by "crimping" gasket 30 between end element 13a' and tubular body 3. Preferably, gasket 30 also includes through holes 31 equal in number and position to through holes 17, so that it can be "crimped" effectively between end element 13a' and tubular body 3 by tightening screws 16.

End element 13a' moreover comprises an electrical connectors 14 for electrically connecting the emitter and/or receiver of optical unit 1 and/or for its power supply. Moreover, additional connectors are preferably present for connecting to a monitoring and control unit (not illustrated) of light barrier 10.

These characteristics, as per the above, had already been included in the first embodiment of end body 13a.

End element 13a' preferably comprises a substantially plate-like body 13c delimited by two surfaces 11, 11' (shown in FIG. 23) which are substantially parallel to each other and perpendicular to the axial direction when the end element is assembled on tubular body 3, and an edge side surface 6, which substantially represents a geometric continuation of casing 5 of tubular body 3 along the X axis when the end element is assembled on tubular body 3. One 11' of the two parallel surfaces faces opening 4 when end element 13a' is closed on tubular body 3, and is therefore called internal surface, while opposite surface 11 is called external surface of end element 13a. Advantageously, a ring seat 34 is created on edge side surface 6 extending circularly around entire surface 6 in the form of a ring, and is created as a groove.

Electrical connector 14 preferably has a cylindrical shape and is coupled to end element 13a by means of a protruding body 35, such as a cylindrical shaft, which is oriented in the axial direction starting from substantially the center of end element 13a', and moving away from end element 13a' from surface 11 outside shell 2. However, protruding body 35 can also be coupled to electrical connector 14. Moreover, protruding body 35 preferably includes a casing 35a and a seat 60, which are preferably ring-shaped and extend circularly around the entire casing of the protruding body. Preferably, the seat is created close to wall 11, as better described hereinafter.

Unit 1 moreover includes a cover or lid element 40, which is suitable for being coupled to end 2a to cover external surface 11 of end element 13a', which presents the seats of screws 16 or other elements of the tubular body and/or end element which are best covered in order to prevent them from being exposed to the external environment outside shell 2. Cover element 40 is hence suitable for covering a portion of the shell in which the elements were connected, such as the portion of tubular body 3 in which end body 13a' is placed—that is end 7a—which serves to close opening 4. Preferably cover element 40 is substantially shaped as "a cup" and comprises a central portion 44 arranged in a direction substantially perpendicular to axial direction X to cover surface 11 of end element 13a'. Preferably, external surface 11 and central portion 44 are substantially parallel. A concave casing 41 including an external perimeter edge extends from central portion 44 in a direction substantially parallel to the X axis, with a shape similar to the geometry of a section of tubular body 3. The dimension of external perimeter edge 42 ensure that when end element 40 is coupled to tubular body 3, casing 5 of tubular body 5 and concave shell 41 are substantially the geometric continuation of each other. Moreover, cover element 40 comprises a through hole 43 in central part 44. When cover element 40 is coupled to end element 13a' and tubular element 3, the through hole is in a position that corresponds to protruding or cylindrical body 35 in order to allow the latter to protrude from the cover element out of through hole 43. Furthermore, when cover element 40 is assembled on the tubular body and end element 13a', while protruding body 35 is out of the cover element, seat 60 created in protruding body 35 is aligned with through hole 35. Concave shell 41 defines an internal surface 46 and an external surface 47, wherein the external surface is the visible surface when the cover element is assembled on tubular body 3. The internal and external surfaces are connected by an edge surface 48 (see FIG. 23), which is part of external perimeter edge 42, substantially perpendicular to the radial direction. Advantageously, external surface 47 is smooth and does not present seats or roughness.

As shown in FIG. 3, in order to be coupled to tubular body 3, in order to cover end element 13a', cover element 40 must be inserted axially (that is to say with a movement along the X axis) on tubular body 3 and end element 13a', in order to insert protruding body 35 holding connector 14 within the through hole 43.

Optical unit 1 also includes a sealing system in order to fasten cover element 40 hermetically on shell 2. The sealing system includes a first sealing element 50, which in the preferred embodiment is a gasket. In the preferred embodiment illustrated in FIGS. 19-22, first sealing element 50 presents through holes 51 for receiving screws 16 suitable for tightening end element 13a' on tubular body 3 and in this case also gasket 50 on end element 13a'. However said through holes and fastening gasket 50 by means of screws is not necessary and can be omitted according to the present invention.

Ring-shaped gasket 50 is preferably inserted in seat 34 created in end element 13a'. Gasket 50 is provided with an axial dimension and a radial dimension. The axial dimension corresponds to the extension of gasket 50 along the X axis. The radial dimension is its extension along a ray R. Moreover, gasket 50 advantageously includes a first portion or ring 52 with a second portion or flange 53 extending from one of its ends, wherein the first and the second portions substantially form an "L". Flange 53 preferably departs from an axial end of ring 52 in the radial direction. Therefore, the radial extension of the second portion is greater than the radial extension of the first portion. Seat 34 and gasket 50 are better illustrated in FIG. 23. Seat 34 includes a bottom surface 34a, which is substantially ring-shaped and parallel to the X axis. Two surfaces 34b, 34c depart from bottom surface 34a, delimiting the dimension of seat 34 in the axial direction. Two surfaces 34b and 34c preferably face each other, and more preferably are parallel to each other, and still more preferably extend in the radial direction. Preferably, the radial extension of surface 34c is greater than the radial extension of surface 34b.

Gasket 50 is received in the seat, so that it leans on bottom wall 34a and is limited in its axial movements by two surfaces 34c, 34b. Preferably, but not necessarily, the axial dimension of the seat, that is the distance between two surfaces 34b and 34c, is less than the axial dimension of gasket 50 when unassembled, so that the latter has to be compressed axially in order to be inserted into seat 34. In this manner the movement of gasket 50 is limited. First portion 52 of the gasket is substantially almost completely contained in seat 34, "slightly" protruding from it in the radial direction before coupling cover element 40; that is to say, the thickness of the first portion of the gasket in the radial direction is greater than the extension of surface 34*b* (but not 34*c*) in the radial direction when not compressed, however this excess extension in the radial direction is such that if the first portion is compressed in the radial direction, it is completely contained in seat 34 without protruding from it. Second portion 53 protrudes from the seat in the radial direction by a greater amount than first portion 52, while its radial extension is similar to the radial extension of surface 34*c*. Even when compressing second portion 53 in the radial direction, its radial extension would not fit completely inside seat 34, that is its radial extension would still be greater than the radial extension of surface 34*b*.

Therefore as can be seen in FIG. 23 and in FIG. 24*a*, when cover element 40 is coupled to tubular body 3, first portion 52 of gasket 50 is compressed between two surfaces: a first surface 49 part of internal surface 46 and which belongs to perimeter edge 42 of cover element 40, and bottom surface 34*a* of seat 34. In fact, when sliding cover element 40 on shell 2, and in particular when sliding cover element 40 on end element 13*a*', perimeter edge 42 slides over seat 34 crimping and compressing first portion 52 as a result of the deformation of first portion 52, which is radially contained inside seat 34, in order to conveniently size concave casing 41, which is provided with a radial dimension equal to the maximum radial extension of surface 34*b*, permitting cover element 40 to slide over first portion 42 until leaning against an arm of the L defined by second portion 53. First portion 52 is hence compressed between two substantially opposite surfaces while both are substantially parallel to the X axial direction: The first surface is bottom surface 34*a* of seat 34, while second surface 49 is part of internal surface 46 of cover element 40 in correspondence with its perimeter edge 42. This surface is indicated with number 49 in FIG. 23.

The compression of first portion 52 between surfaces 34*a* and 49 elicits a reaction from the elastic material in which first sealing element 50 is manufactured. This force extends radially as indicated by the arrows in FIG. 23, and is denominated "Frad". Therefore, the reaction force directed towards surface 34*a* and towards surface 49 holds the surfaces blocked in place.

When gasket 50 is mounted on end element 13*a*', which is in turn mounted on tubular body 3, second portion 53 is closer in the axial direction to end 7*a* of tubular body 3.

Second portion 53 of gasket 50 is not crimped between surface 34*a* and surface 49 because it extends radially to such a large extent that it prevents casing 41 of cover element 40 crossing above it. Therefore, second portion 53 is not covered by cover element 40 and remains visible between casing 5 of tubular body 3 and casing 41 of cover element 40 as a ring surrounding tubular body 3. Second portion 53 is axially delimited from one side by surface 34*c* of seat 34, which extends to a larger extent in the axial direction, and from the other by edge surface 48 of the cover element. Surface 34*c* is not in contact with cover element 40. Preferably these two surfaces 34*b* and 34 *c* of seat 34 are substantially oriented in a radial and perpendicular direction to surfaces 34*a* and 49 compressing first portion 52 of gasket 50; however they do not generate an axial compression force against the second portion in the state of incomplete assembly shown in FIGS. 21 and 23.

Preferably, crimping surface 49 comprises a plurality of ribs and/or grooves in order to make the surface itself "lined" and provide the empty spaces that the material of gasket 50 can fill when it is compressed (see FIG. 23 and the detail in FIG. 24*a*). In the state of incomplete assembly shown in FIGS. 23 and 21 first sealing element 50 is solidly coupled to tubular body 3 in order to compress it between cover element 40 and end element 13*a*'. However in this state there are substantially no forces in the axial direction, or in any case there are no significant forces in the axial direction that can maintain cover element 40 blocked in place against end element 13*a*' in the axial direction. Second portion 53 is not thrust axially against tubular body 3 or cover element 40 in order to prevent fissures. Moreover, the lack of significant axial forces can readily cause the accidental removal of cover element 40 from tubular body 3 as a result of vibration.

The sealing system—in the complete assembly according to the invention—includes a second sealing element, preferably a gasket 70. The gasket, which is advantageously ring-shaped, is fitted on protruding body 35 until reaching seat 60 created in a position corresponding to through hole 43 created on cover element 40.

Moreover, gasket 70 advantageously includes a second portion or ring 71 with a first portion or flange 72 extending from one of its ends, wherein the first and the second portions substantially form an "L". Flange 72 preferably departs from an axial end of ring 71 in the radial direction. Therefore the radial extension of first portion 72 is greater than the radial extension of second portion 71. Seat 60 and gasket 70 are better illustrated in FIG. 24 and in the enlarged detail in FIG. 24*b*.

Seat 60 comprises a bottom wall 61 from which two opposing surfaces 62, 63 arise in the radial direction. Preferably radial surfaces 62, 63 are substantially perpendicular to bottom surface 61 and extend radially. Second sealing element 50 is inserted between these surfaces 62 and 63, resting on bottom surface 61. The axial dimension of seat 60 is given by the distance between the two surfaces, that is the length of bottom surface 61, while the radial extension of the same is given by the radial extension of surfaces 62, 63.

Preferably, through hole 43 defines a circular edge 43*a* delimiting hole 43, which in turn comprises a surface 43*b* substantially facing seat 60 when cover element 40 is coupled to end element 13*a*'. Surface 43*b* presents a plurality of grooves and/or ribs to allow gasket 70 to expand when compressed.

Preferably, but not necessarily, the axial dimension of seat 60, that is the distance between two surfaces 62 and 63, is less than the axial dimension of gasket 70 when not compressed, so that the latter has to be compressed axially in order to be inserted into seat 60. In this manner the axial movement of gasket 70 is limited. Second portion 71 of gasket 70 is substantially almost completely contained in seat 60, "slightly" protruding from it in the radial direction, considering that cover element 40 is not present; that is to say, the thickness of second portion 71 of gasket 70 in the radial direction is greater than the extension of surfaces 62, 63 in the radial direction, however this excess extension in the radial direction is such that if second portion 71 is compressed in the radial direction, it is completely contained in seat 60 without protruding from it. First portion 72 protrudes in the radial direction from the seat to a greater extent than second portion 71. Even when compressing first portion 72 in the radial direction, its radial extension would not be completely contained inside seat 60, that is to say it would not be less than the distance between bottom surface 61 of seat 60 and surface 43b of perimeter edge 43a of through hole 43 of cover element 40.

Therefore as can be seen in FIGS. 24 and 24b, when second sealing element 70 is inserted in protruding body 35, second portion 71 of gasket 70 is inserted and compressed between two surfaces: first surface 43b belonging to perimeter edge 43a of hole 43 of cover element 40 and bottom surface 61 of seat 60. This "crimping" is caused by the insertion of second portion 71 between the two aforementioned surfaces. Gasket 70 is inserted into the space or fissure created by two surfaces 23b and 61 until external surface 47 of cover element 40 leans against an arm of the L defined by first portion 72 of gasket 70. First portion 72 is introduced axially into seat 60, that is it rests against bottom wall 61, but as a result of its radial extension it does not penetrate between two surfaces 43b and 61, so that part of it leans against external surface of the cover element and preferably against a surface 43c of perimeter edge 43a of through hole 43. The circular closure by means of first portion 72 of gasket 70 of through hole 43 also permits to maintain the hermetic seal.

Therefore, from this insertion of gasket 70 into seat 60, second portion 71 is hence preferably compressed between two substantially opposite surfaces while more preferably both are substantially parallel to the X axial direction: The first surface is bottom surface 61 of seat 60, while the second surface is a surface 43b of cover element 40 in correspondence with its perimeter edge 43a of through hole 43. This compression generates a radial force that holds two surfaces 43b, 61 together radially, and hence, even cover element 40 and protruding body 35. The compression of second portion 71 between surfaces 43b and 61 elicits a reaction from the elastic material in which second sealing element 70 is manufactured. This force extends radially as indicated by the arrows in FIG. 24b, and is denominated "Frad". Therefore the reaction force directed towards surface 43b and towards surface 61 holds the surfaces blocked in place.

However in this case, because first portion 72 is also compressed between surface 43c of perimeter edge 43a of through hole 43 and wall 63 of seat 60, which are radial walls, an axial force is generated as a result of this compression, which is indicated as "Faxial" in FIG. 24b. This axial force "thrusts" cover element 40 in the direction of tubular body 3, and hence an axial force, indicated as "Faxial", is in turn acting on the first sealing element. In fact because axial force Faxial acting on cover element 40 as a result of the compression between two radial walls 43c and 63 of first portion 72 of gasket 70, an axial force Faxial' acts on second portion 53 of gasket 50, thrusting it towards surface 34b of seat 34.

In this manner, the double sealing system that includes two sealing elements 50, 70 generates two perpendicular forces between cover element 40 and tubular body 3, which hold these two elements in contact even when subjected to forces in any direction.

FIGS. 25 and 26 illustrate an additional embodiment of unit 1. In this embodiment, protruding body 35 does not serve any auxiliary function in addition to anchoring second gasket 70 and hence generating the axial thrust force Faxial. In fact, said protruding body 35 is not coupled to any connector 14.

The assembly of unit 1 is carried out in the following manner.

The needed optics (not illustrated in the figures) are inserted in tubular body 3 through opening 4. End element 13a' is then coupled to end 7a of tubular body 3 in order to close opening 4. Coupling is preferably carried out by interposing gasket 30 between internal surface 11' of end element 13a' and end 7a of the tubular body. Fastening end element 13a' and gasket 30 to tubular body 3 is carried out by means of screws 16. This step of the assembly is shown in FIG. 20.

Gasket 50 is then inserted inside seat 34 in end element 13a', potentially by means of axial compression of the gasket between two radial surfaces 34b, 34c of seat 34. This step of is illustrated in FIG. 21.

Cover element 40 is then inserted on end element 13a': Protruding body 35 is brought out of through hole 43, while perimeter edge 42 of cover element leans against gasket 50. The cover element "crimps" the first portion of gasket 50 by compressing it radially inside seat 34 and generating a radial reaction force. Therefore, a radial force holds cover element 40 and tubular body 3 together. This stage is illustrated in FIG. 21 and in FIG. 23.

Then second gasket 70 is fitted in protruding body and inserted into seat 60, which is created in correspondence with through hole 43. In its axial movement with its first portion 72 protruding radially, the gasket leans against external surface 47 of cover element 40 in correspondence with a perimeter edge of through hole 43. Axial movement of gasket 70 is prevented by surface 62 of the seat. Therefore, an axial force is generated as a result of the compression of gasket 70 between two radial walls. Second portion 71 of gasket 70 is inserted between bottom surface 61 of seat 60 and surface 43b of perimeter edge 43a of hole 43, generating in the process an additional radial force.

The invention claimed is:

1. An optical module for an optical unit of a light barrier, the optical module comprising:
    at least one radiation emitter and/or receiver for transmitting and/or receiving radiation forming the light barrier;
    a tubular body suitable for housing the radiation emitter and/or receiver, wherein the tubular body comprises a first and a second element welded together to form the tubular body, wherein each the first and second elements defines an internal surface having at least one groove facing each other, and wherein the first and second elements are made of stainless steel;
    a first and a second end element fastened to a first and a second end, respectively, of the tubular body closing it thereto; and
    a support inserted into the grooves of the internal surfaces of the first and second elements, and upon which the radiation emitter and/or receiver is disposed within the tubular body.

2. The module according to claim 1, wherein the first and the second end element are manufactured in stainless steel.

3. The module according to claim 1, wherein according to American Iron and Steel Institute (AISI) notation the stainless steel, belongs to series 3xx.

4. The module according to claim 2, where according to AISI notation the stainless steel is of type 316L.

5. The module according to claim 1, wherein the first or second element is shaped with a cross-section shaped as a C or U in a plane substantially perpendicular to a principal dimension of the tubular body.

6. The module according to claim 1, wherein one of the first and the second elements includes one or more pins for coupling with the other of the first and second elements by interference fit.

7. The module according to claim 6, wherein the first or second element include one or more seats for receiving the one or more pins by interference fit.

8. The module according to claim 1, including an opening in the tubular body in order to form a window for the emitter or receiver.

9. The module according to claim 8, including a transparent plate for closing the window.

10. The module according to claim 8, wherein the opening in the tubular body is created for a first portion in the first element and for a second portion in the second element.

11. The module according to claim 8, comprising a flange, wherein the flange surrounds at least part of the window, and includes a seat for depositing the glue.

12. The module according to claim 1, wherein the first or second groove extends for the entire length (L) of the tubular body.

13. The module according to claim 1, wherein the support includes a printed circuit board upon which the radiation emitter and/or receiver is mounted.

14. The module according to claim 1, further comprising a sealing element disposed between each of the first and second end elements and their respective ends of the tubular body.

15. The module according to claim 14, each of the first and second end elements is coupled to the tubular body by with tightening screws engaging tubular body.

16. The module according to claim 14, wherein sealing element includes a gasket.

17. The module according to claim 14, wherein sealing element includes a connector protruding from at least one end of the tubular body.

18. The module according to claim 1, wherein the tubular housing has thickness between 1 mm and 8 mm.

* * * * *